(12) United States Patent
Pan et al.

(10) Patent No.: US 11,755,640 B2
(45) Date of Patent: Sep. 12, 2023

(54) DNA-BASED IMAGE STORAGE AND RETRIEVAL

(71) Applicant: The Board of Trustees of the University of Illinois, Urbana, IL (US)

(72) Inventors: Chao Pan, Urbana, IL (US); S. M. Hossein Tabatabaei Yazdi, Upland, CA (US); SeyedKasra Tabatabaei, Urbana, IL (US); Alvaro G. Hernandez, Champaign, IL (US); Charles M. Schroeder, Urbana, IL (US); Olgica Milenkovic, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 390 days.

(21) Appl. No.: 17/102,143

(22) Filed: Nov. 23, 2020

(65) Prior Publication Data
US 2021/0191970 A1 Jun. 24, 2021

Related U.S. Application Data

(60) Provisional application No. 62/951,105, filed on Dec. 20, 2019.

(51) Int. Cl.
*G06F 16/583* (2019.01)
*G06T 5/00* (2006.01)
(Continued)

(52) U.S. Cl.
CPC .......... *G06F 16/5838* (2019.01); *G06F 16/50* (2019.01); *G06F 16/56* (2019.01);
(Continued)

(58) Field of Classification Search
CPC ...... G06F 16/5838; G06F 16/50; G06F 16/56; G06T 1/0007; G06T 5/005;
(Continued)

(56) References Cited

U.S. PATENT DOCUMENTS

| 6,223,128 B1 | 4/2001 | Allex et al. |
| 7,227,900 B2 | 6/2007 | Porter et al. |

(Continued)

FOREIGN PATENT DOCUMENTS

WO  2008087042 A1  7/2008

OTHER PUBLICATIONS

D. Bajic, et al.; "A simple suboptimal construction of cross-bifix-free codes"; Cryptography and Communications archive 6:27-37 (Aug. 8, 2013).

(Continued)

*Primary Examiner* — Amandeep Saini
*Assistant Examiner* — Daniella M. DiGuglielmo
(74) *Attorney, Agent, or Firm* — McDonnell Boehnen Hulbert & Berghoff LLP

(57) ABSTRACT

An embodiment may involve obtaining an image composed of color channels, wherein each of the color channels represents colors therein with n bits per pixel; quantizing each of the color channels to be represented by m bits per pixel; using a space-filling curve to convert each of the color channels as quantized into respective vectors; generating, for each of the respective vectors, a respective set of m arrays, wherein the m arrays for a particular vector of the respective vectors contain indices of where a fixed value selected from a range of 0 to m−1 is found in the particular vector; applying, to each of the m arrays for each of the respective vectors, differential encoding and compression of the indices therein; mapping each of the m arrays for each of the respective vectors to blocks of nucleotides; synthesizing the blocks; and storing, in a DNA-based storage medium, the blocks.

20 Claims, 15 Drawing Sheets

(51) Int. Cl.
    *H04N 19/176*     (2014.01)
    *H04N 19/186*     (2014.01)
    *G06T 1/00*     (2006.01)
    *G06F 16/50*     (2019.01)
    *G06F 16/56*     (2019.01)
    *H04N 19/124*     (2014.01)
    *G06V 40/16*     (2022.01)
    *G06T 1/60*     (2006.01)
    *H04N 19/86*     (2014.01)
    *H04N 19/423*     (2014.01)

(52) U.S. Cl.
CPC .............. *G06T 1/0007* (2013.01); *G06T 1/60* (2013.01); *G06T 5/005* (2013.01); *G06V 40/168* (2022.01); *H04N 19/124* (2014.11); *H04N 19/176* (2014.11); *H04N 19/186* (2014.11); *G06T 2207/10024* (2013.01); *G06T 2207/20081* (2013.01); *H04N 19/423* (2014.11); *H04N 19/86* (2014.11)

(58) Field of Classification Search
CPC . G06T 2207/10024; G06T 2207/20081; G06T 1/60; G06V 40/168; H04N 19/124; H04N 19/176; H04N 19/186; H04N 19/129; H04N 19/86; H04N 19/423
See application file for complete search history.

(56) References Cited

U.S. PATENT DOCUMENTS

| | | | |
|---|---|---|---|
| 9,996,778 B2* | 6/2018 | Church | G06K 19/00 |
| 10,370,246 B1 | 8/2019 | Milenkovic | |
| 10,566,077 B1 | 2/2020 | Milenkovic | |
| 11,538,554 B1 | 12/2022 | Milenkovic | |
| 2004/0001371 A1 | 1/2004 | Mansuripur et al. | |
| 2005/0053968 A1 | 3/2005 | Bharadwaj et al. | |
| 2015/0261664 A1* | 9/2015 | Goldman | B82Y 10/00 |
| | | | 711/154 |
| 2017/0141793 A1 | 5/2017 | Strauss et al. | |
| 2018/0127804 A1 | 5/2018 | Dean et al. | |
| 2020/0004926 A1* | 1/2020 | Strauss | G16B 25/20 |
| 2020/0035331 A1 | 1/2020 | Milenkovic | |
| 2020/0185057 A1* | 6/2020 | Leake | G11C 13/02 |
| 2021/0074380 A1* | 3/2021 | Yekhanin | G06F 16/90344 |
| 2021/0098081 A1* | 4/2021 | Yekhanin | G16B 30/10 |
| 2021/0103824 A1 | 4/2021 | Milenkovic | |
| 2021/0125079 A1 | 4/2021 | Milenkovic | |

OTHER PUBLICATIONS

V. Baldoni, et al.; "A user's guide for LattE integrale v1.7.2"; retrieved from https://www.math.ucdavis.edu/~latte/software/packages/latte_current/manual_v1.7.2.pdf on Mar. 8, 2017; (Oct. 2014).
T. Abualrub, et al.; "Construction of cyclic codes over GF(4) for DNA computing"; Journal of the Franklin Institute, 343, pp. 448-457 (2006).
D.H. Wood; "Applying error correcting codes to DNA computing (Abstract)"; Proceedings of the 4th DIMACS International Meeting on DNA Based Computing, pp. 109-110 (1998).
M. Hagiwara; "A short proof for the multi-deletion error correction property of Helberg codes,"; IEICE Communications Express, vol. 5, No. 2, pp. 49-51 (Jan. 25, 2016).
O. Milenkovic, et al.; "On the design of codes for DNA computing"; Coding and Cryptography International Workshop, Revised Selected Papers, pp. 100-119 (Mar. 14-18, 2005).
J.I. Hall; "Notes on Coding Theory (Chapter 5—Generalized Reed-Solomon Codes)"; Department of Mathematics, Michigan State University; available online at http://users.math.msu.edu/users/jhall/classes/codenotes/coding-notes.html; (Jan. 7, 2015 revision).
J.I. Hall; "Notes on Coding Theory (Chapter 6—Modifying Codes)"; Department of Mathematics, Michigan State University; available online at http://users.math.msu.edu/users/jhall/classes/codenotes/coding-notes.html; (Jan. 7, 2015 revision).
J.I. Hall; "Notes on Coding Theory (Chapter 7—Codes over Subfields)"; Department of Mathematics, Michigan State University; available online at http://users.math.msu.edu/users/jhall/classes/codenotes/coding-notes.html; (Jan. 7, 2015 revision).
J.I. Hall; "Notes on Coding Theory (Chapter 8—Cyclic Codes)"; Department of Mathematics, Michigan State University; available online at http://users.math.msu.edu/users/jhall/classes/codenotes/coding-notes.html; (Jan. 7, 2015 revision).
J.I. Hall; "Notes on Coding Theory (Chapter 9—Weight and Distance Enumeration)"; Department of Mathematics, Michigan State University; available online at http://users.math.msu.edu/users/jhall/classes/codenotes/coding-notes.html; (Jan. 7, 2015 revision).
D. R. Zerbino, et al.; "Velvet: algorithms for de novo short read assembly using de Bruijn graphs,"; Genome Res., vol. 18, No. 5, pp. 821-829 (May 2008).
S. Gnerre, et al.; "High-quality draft assemblies of mammalian genomes from massively parallel sequence data,"; Proc. Natl. Acad. Sci. U.S.A., vol. 108, No. 4, pp. 1513-1518 (Jan. 2011).
R. Li, et al.; "De novo assembly of human genomes with massively parallel short read sequencing," Genome Res., vol. 20, No. 2, pp. 265-272 (Feb. 2010).
J. T. Simpson, et al.; "ABySS: a parallel assembler for short read sequence data,"; Genome Res., vol. 19, No. 6, pp. 1117-1123 (Jun. 2009).
J. T. Simpson, et al.; "Efficient de novo assembly of large genomes using compressed data structures,"; Genome Res., vol. 22, No. 3, pp. 549-556 (Mar. 2012).
S. Kannan, et al.; "More on reconstructing strings from random traces: insertions and deletions,"; Proc. IEEE Intl. Inform. Theory; IEEE; pp. 297-301. (2005).
J. Acharya, et al.; "Quadratic-backtracking algorithm for string reconstruction from substring compositions,"; Proc. IEEE Intl. Symp. Inform. Theory; IEEE; pp. 1296-1300 (2014).
P. Medvedev, et al.; "Computability of models for sequence assembly,"; Algorithms in Bioinformatics; Springer; pp. 289-301 (2007).
P. E. Compeau, et al.; "How to apply de Bruijn graphs to genome assembly,"; Nature biotechnology, vol. 29, No. 11, pp. 987-991 (2011).
P. Jacquet, et al.; "Counting Markov types, balanced matrices, and Eulerian graphs,"; IEEE Trans. Inform. Theory; vol. 58, No. 7, pp. 4261-4272 (2012).
K. Nakamura, et al.; "Sequence-specific error profile of Illumina sequencers,"; Nucleic acids research; p. gkr344, (2011).
T. Kløve; "Error correcting codes for the asymmetric channel."; Department of Pure Mathematics, University of Bergen, (1981).
E. Ukkonen; "Approximate string-matching with q-grams and maximal matches,"; Theoretical computer science, vol. 92, No. 1, pp. 191-211 (1992).
N. G. de Bruijn; "A combinatorial problem,"; Koninklijke Nederlandse Akademie v. Wetenschappen, vol. 49, No. 49, pp. 758-764 (1946).
R. K. Ahuja, et al.; "Network flows: theory, algorithms, and applications."; Prentice Hall (1993).
R. P. Stanley; "Enumerative combinatorics."; Cambridge university press; vol. 1. (2011).
R. Varshamov; "A class of codes for asymmetric channels and a problem from the additive theory of numbers,"; IEEE Trans. Inform. Theory, vol. 19, No. 1, pp. 92-95 (1973).
J. N. Cooper, et al.; "Generalized de Bruijn cycles,"; Annals of Combinatorics, vol. 8, No. 1, pp. 13-25 (2004).
A. Jiang, et al.; "Rank modulation for flash memories,"; IEEE Trans. Inform. Theory; vol. 55, No. 6, pp. 2659-2673 (2009).
A. Barg, et al.; "Codes in permutations and error correction for rank modulation,"; IEEE Trans. Inform. Theory; vol. 56, No. 7, pp. 3158-3165 (2010).
F. Famoud, et al.; "Error-correction in flash memories via codes in the Ulam metric,"; IEEE Trans. Inform. Theory; vol. 59, No. 5, pp. 3003-3020 (2013).

(56) References Cited

OTHER PUBLICATIONS

F. Famoud, et al.; "Multipermutation codes in the Ulam metric for nonvolatile memories,"; Selected Areas in Communications IEEE Journal on; vol. 32, No. 5, pp. 919-932 (2014).

T. Alderson, et al.; "On maximum Lee distance codes,"; J. of Discrete Mathematics (2013).

J. Astola; "The Theory of Lee-codes,"; Lappeenranta University of Technology, Department of Physics and Mathematics, Research Report (Jan. 1982).

P. Delsarte; "An algebraic approach to the association schemes of coding theory,"; Doctoral dissertation, Universite Catholique de Louvain (1973).

A. Fazeli, et al.; "Generalized Sphere Packing Bound,"; available at http://arxiv.org/abs/1401.6496 (2014).

Feng, J., et al.; "Identification of Single Nucleotides in MoS2 Nanopores,"; arXiv preprint, arXiv:1505.01608 (2015).

R. Feynman; "There's Plenty of Room at the Bottom,"; Caltech, Pasadena; Lecture (Dec. 29, 1959).

E. Hof, et al., "Capacity-achieving polar codes for arbilrarily permuted parallel channels,"; IEEE Trans. on Info. Theory; vol. 59, No. 3, pp. 1505-1516 (Mar. 2013).

M. Kaykobad' "Positive solutions of positive linear systems,"; Lin. Alg. and its App., vol. 64, pp. 133-140 (Jan. 1985).

A.A. Kulkarni, et al.; "Nonasymptotic upper bounds for deletion correcting codes,"; IEEE Trans. on Info. Theory, vol. 59, No. 8, pp. 5115-5130 (Apr. 2013).

A. Mazumdar, et al.; "Coding for high-density recording on a 1-D granular magnetic medium,"; IEEE Trans. on Info. Theory, vol. 57, No. 11, pp. 7403-7417 (Jun. 2011).

T. Richardson, et al.; "The capacity of low-density parity-check codes under message-passing decoding,"; IEEE Trans. on Info. Theory, vol. 47, No. 2, pp. 599-618 (Aug. 2002).

Tal, I., et al.; "How to construct polar codes,"; IEEE Trans. on Info. Theory, vol. 59, No. 10, pp. 6562-6582 (Sep. 2013).

J. Bornholt, et al.; "A dna-based archival storage system,"; Proceedings of the Twenty-First International Conference on Architectural Support for Programming Languages and Operating Systems; ACM, pp. 637-649 (2016).

Ye et al, Primer-Blast: A tool to design target-specific primers for polymerase chain reaction BMC Bioinformatics, vol. 13, article 134 (Year: 2012).

Shendure et al, Next-generation DNA sequencing Nature Biotechnology vol. 26, pp. 1135-1145 (Year: 2008).

Meunier et al, Recombination Drives the Evolution of GC-Content in the Human Genome Molecular Biology and Evolution, vol. 21, pp. 984-990 (Year: 2004).

Huffman, "A Method for the Construction of Minimum-Redundancy Codes", Proceedings of the I.R.E., Sep. 1952, pp. 1098-1101.

Erlich and Zielinski, "DNA Fountain enables a robust and efficient storage architecture", Science 355, 950-954 (Mar. 3, 2017).

'Nazeri et al., "EdgeConnect: Generative Image Inpainting with Adversarial Edge Learning", arXiv preprint ar Xiv:1901.00212, 2019.

Kumar and Milenkovic, "On Unequal Error Protection LDPC Codes Based on Plotkin-Type Constructions", IEEE Transactions on Communication, vol. 54, No. 6, Jun. 2006, pp. 994-1005.

Tomasi and Manduchi, "Bilateral Filtering for Gray and Color Images", in ICCV, 1998, vol. 98, p. 2.

Moon et al., "Analysis of the Clustering Properties of the Hilbert Space-Filling Curve", IEEE Transactions on knowledge and data engineering, vol. 13, No. 1, pp. 124-141, 2001.

Tabatabaei et al., "DNA punch cards for storing data on native DNA sequences via enzymatic nicking". Nature Communications 11, Article No. 1742 (2020).

Yazdi et al., "Portable and Error-Free DNA-Based Data Storage", Scientific Reports, vol. 7, No. 1, pp. 5011, 2017.

Tabatabaei Yazdi, S. M. H., et al.; "A Rewritable, Random-Access DNA-Based Storage System."; Sci. Rep. 5, 14138; doi: 10.1038/srep14138 (Sep. 18, 2015).

Tabatabaei Yazdi, S. M. H., et al.; Supplementary Information for "A Rewritable, Random-Access DNA-Based Storage System"; Sci. Rep. 5, 14138 (Sep. 18, 2015).

Tabatabaei Yazdi, S. M. H., et al.; "Weakly Mutually Uncorrelated Codes"; arXiv: 1601.08176; Published to arxiv.org on Jan. 29, 2016.

Bancroft, C., et al.; "Long-term storage of information in DNA."; Science 293, 1763-1765 (2001).

Davis, J.; "Microvenus"; Art Journal 55, 70-74 (1996).

Church, G. M., et al.; "Next-generation digital information storage in DNA."; Science 337, 1628-1628 (2012).

Goldman, N., et al.; "Towards practical, high-capacity, low-maintenance information storage in synthesized DNA."; Nature 494, 77-80 (2013).

Grass, R. N., et al.; "Robust chemical preservation of digital information on DNA in silica with error-correcting codes."; Angewandte Chemie International Edition 54, 2552-2555 (Feb. 4, 2015).

Ross, M. G., et al.; "Characterizing and measuring bias in sequence data."; Genome Biol 14, R51 (2013).

Cohen, G. D., et al.; "Dc-constrained error-correcting codes with small running digital sum."; Information Theory, IEEE Transactions on 37, 949-955 (1991).

Blaum, M., et al.; "Error-correcting codes with bounded running digital sum."; IEEE transactions on information theory 39, 216-227 (1993).

Gilbert, E.; "Synchronization of binary messages."; Information Theory, IRE Transactions on 6, 470-477 (1960).

Packer, H.; "CRISPR and Cas9 for flexible genome editing."; Technical report. (2014); Available at: www.idtdna.com/pages/products/genes/gblocks-gene-fragments/decoded-articles/decoded/2013/12/13/crispr-and-cas9-for-flexible-genome-editing. (Accessed: Jan. 1, 2015).

Bryksin, A. V., et al.; "Overlap extension PCR cloning: a simple and reliable way to create recombinant plasmids."; Biotechniques 48, 463 (2010).

Schuster, S. C.; "Next-generation sequencing transforms today's biology."; Nature methods 5, 16-18 (2008).

Morita, H., et al.; "On the construction of maximal prefix-synchronized codes."; Information Theory, IEEE Transactions on 42, 2158-2166 (1996).

Milenkovic, O., et al.; "On the design of codes for DNA computing."; In Coding and Cryptography, 100-119 (Springer, 2006).

Rouillard, J.-M., et al.; "Oligoarray 2.0: design of oligonucleotide probes for DNA microarrays using a thermodynamic approach."; Nucleic acids research 31, 3057-3062 (2003).

Guibas, L. J., et al.; "Maximal prefix-synchronized codes."; SIAM Journal on Applied Mathematics 35, 401-418 (1978).

Massey, J. L.; "Optimum frame synchronization."; Communications, IEEE Transactions on 20, 115-119 (1972).

Chee, Y. M., et al.; "Cross-bifix-free codes within a constant factor of optimality."; Information Theory, IEEE Transactions on 59, 4668-4674 (2013).

Blackburn, S. R.; "Non-overlapping codes."; arXiv preprint arXiv:1303.1026 (2013).

Berman, P., et al.; "Approximating maximum independent set in bounded degree graphs."; In SODA, vol. 94, 365-371 (1994).

R. G. Gallager; "Low-density parity-check codes,Information Theory"; IRE Transactions on, vol. 8, No. 1, pp. 2128, (1962).

A. J. De Lind Van Wijngaarden, et al.; "Frame synchronization using distributed sequences,"; Communications, IEEE Transactions on, vol. 48, No. 12, pp. 2127-2138 (2000).

D. Baji'c, et al.; "Distributed sequences and search process,"; Communications, IEEE International Conference on, vol. 1. IEEE, 2004, pp. 514-518 (2004).

S. Bilotta, et al.; "A new approach to cross-bifix-free sets,"; IEEE Transactions on Information Theory, vol. 6, No. 58, pp. 4058-4063 (2012).

H. M. Kiah, et al.; "Codes for dna sequence profiles,"; arXiv preprint; arXiv:1502.00517, published to arxiv.org on Feb. 2, 2015.

Tabatabaei Yazdi, S. M. H., et al.; "DNA-Based Storage: Trends and Methods"; arXiv:1507.01611; published to arxiv.org on Jul. 6, 2015.

D. E. Knuth; "Efficient balanced codes,"; Information Theory, IEEE Transactions on, vol. 32, No. 1, pp. 51-53 (1986).

(56) References Cited

OTHER PUBLICATIONS

E. N. Gilbert; "A comparison of signalling alphabets,"; Bell System Technical Journal, vol. 31, No. 3, pp. 504-522 (1952).
R. L. Graham, et al.; "Lower bounds for constant weight codes,"; Information Theory, IEEE Transactions on, vol. 26, No. 1, pp. 37-43(1980).
S. M. Johnson; "A new upper bound for error-correcting codes,"; Information Theory, IRE Transactions on, vol. 8, No. 3, pp. 203-207 (1962).
"gBlocks (TM) Gene Fragments Cloning Protocols"; http://www.idtdna.com/pages/docs/synthetic-biology/gblocks-user-guide.pdf; retrieved Nov. 15, 2016.
"Overlap Extension Polymerase Chain Reaction"—Wikipedia article; https://en.wikipedia.org/wiki/Overlap_extension_polymerase_chain_reaction; retrieved Nov. 15, 2016.
I. S. Reed, et al.; "Polynomial codes over certain finite fields,"; Journal of the society for industrial and applied mathematics, vol. 8, No. 2, pp. 300-304 (1960).
H. M. Kiah, et al.; "Codes for dna storage channels,"; arXiv preprint arXiv:1410.8837, published to arxiv.org on Oct. 31, 2014.
R. Gabrys, et al.; "Asymmetric lee distance codes for dna-based storage,"; arXiv preprint arXiv:1506.00740, published to arxiv.org on Jun. 2, 2015.
S. Kosuri, et al.; "Large-scale de novo dna synthesis: technologies and applications,"; Nature methods, vol. 11, No. 5, pp. 499-507 (2014).
J. Tian, et al.; "Advancing high-throughput gene synthesis technology,"; Molecular BioSystems, vol. 5, No. 7, pp. 714-722 (2009).
S. Ma, et al.; "Dna synthesis, assembly and applications in synthetic biology,"; Current opinion in chemical biology, vol. 16, No. 3, pp. 260-267 (2012).
S. Ma, et al.; "Error correction in gene synthesis technology,"; Trends in biotechnology, vol. 30, No. 3, pp. 147-154 (2012).
A. Michelson, et al.; "Nucleotides part xxxii. synthesis of a dithymidine dinucleotide containing a 3': 5'-internucleotidic linkage,"; Journal of the Chemical Society (Resumed), pp. 2632-2638 (1955).
R. Hall, et al.; "644. nucleotides, part xli. mixed anhydrides as intermediates in the synthesis of dinucleoside phosphates,"; Journal of the Chemical Society (Resumed), pp. 3291-3296 (1957).
P. T. Gilham, et al.; "Studies on polynucleotides, i. a new and general method for the chemical synthesis of the c5 internucleotidic linkage. syntheses of deoxyribo-dinucleotides1,"; Journal of the American Chemical Society, vol. 80, No. 23, pp. 6212-6222 (1958).
S. Roy, et al.; "Synthesis of dna/ma and their analogs via phosphoramidite and h-phosphonate chemistries,"; Molecules, vol. 18, No. 11, pp. 14 268-14 284 (2013).
C. B. Reese; "Oligo-and poly-nucleotides: 50 years of chemical synthesis,"; Organic & biomolecular chemistry, vol. 3, No. 21, pp. 3851-3868 (2005).
B. C. Froehler, et al. "Synthesis of dna via deoxynudeoside h-phosphonate intermediates,"; Nucleic Acids Research, vol. 14, No. 13, pp. 5399-5407 (1986).
P. J. Garegg, et al.; "Nucleoside h-phosphonates. iii. chemical synthesis of oligodeoxyribonucleotides by the hydrogenphosphonate approach,"; Tetrahedron letters, vol. 27, No. 34, pp. 4051-4054 (1986).
H. Khorana, et al.; "Syntheses of dideoxyribonucleotides,"; Journal of the American Chemical Society, vol. 79, No. 4, pp. 1002-1003 (1957).
S. Beaucage, et al.; "Deoxynudeoside phosphoramiditesa new class of key intermediates for deoxypolynucleotide synthesis,"; Tetrahedron Letters, vol. 22, No. 20, pp. 1859-1862 (1981).
N. Sinha, et al.; "Polymer support oligonucleotide synthesis xviii1. 2): use of cyanoethyi-n, ndialkylamino-/n-morpholino phosphoramidite of deoxynucleosides for the synthesis of dna fragments simplifying deprotection and isolation of the final product," Nucleic Acids Research, vol. 12, No. 11, pp. 4539-4557 (1984).
S. P. Fodor, et al.; "Light-directed, spatially addressable parallel chemical synthesis,"; Science, vol. 251 (1991).

A. C. Pease, et al.; "Light-generated oligonucleotide arrays for rapid dna sequence analysis,"; Proceedings of the National Academy of Sciences, vol. 91, No. 11, pp. 5022-5026 (1994).
X. Gao, et al.; "In situ synthesis of oligonucleotide microarrays,"; Biopolymers, vol. 73, No. 5, pp. 579-596 (2004).
T. R. Hughes, et al.; "Expression profiling using microarrays fabricated by an ink-jet oligonucleotide synthesizer,"; Nature biotechnology, vol. 19, No. 4, pp. 342-347 (2001).
S. Singh-Gasson, et al.; "Maskless fabrication of light-directed oligonucleotide microarrays using a digital micromirror array,"; Nature biotechnology, vol. 17, No. 10, pp. 974-978 (1999).
E. F. Nuwaysir, et al.; "Gene expression analysis using oligonucleotide arrays produced by maskless photolithography,"; Genome research, vol. 12, No. 11, pp. 1749-1755 (2002).
A. L. Ghindilis, et al.; "Combimatrix oligonucleotide arrays: genotyping and gene expression assays employing electrochemical detection,"; Biosensors and Bioelectronics, vol. 22, No. 9, pp. 1853-1860 (2007).
D. S. Kong, et al.; "Parallel gene synthesis in a microfluidic device,"; Nucleic acids research, vol. 35, No. 8, p. e61, (2007).
E. M. LeProust, et al.; "Synthesis of high-quality libraries of long (150mer) oligonucleotides by a novel depurination controlled process,"; Nucleic acids research, vol. 38, No. 8, pp. 2522-2540 (2010).
L.-C. Au, et al.; "Gene synthesis by a lcr-based approach: High-level production of leptin-I54 using synthetic gene inescherichia coli,"; Biochemical and biophysical research communications, vol. 248, No. 1, pp. 200-203 (1998).
W. P. Stemmer, et al.; "Single-step assembly of a gene and entire plasmid from large numbers of bligodeoxyribonucleotides,"; Gene, vol. 164, No. 1, pp. 49-53 (1995).
D. G. Gibson; "Synthesis of dna fragments in yeast by one-step assembly of ovedapping oligonucleotides,"; Nucleic acids research, p. gkp687 (2009).
D. G. Gibson, et al.; "Chemical synthesis of the mouse mitochondrial genome,"; nature methods, vol. 7, No. 11, pp. 901-903 (2010).
J. Tian, et al.; "Accurate multiplex gene synthesis from programmable dna microchips,"; Nature, vol. 432, No. 7020, pp. 1050-1054 (2004).
A. Y. Borovkov, et al.; "Highquality gene assembly directly from unpurified mixtures of microarraysynthesized oligonucleotides,"; Nucleic acids research, vol. 38, No. 19, pp. e180-e180 (2010).
S. Kosuri, et al.; "Scalable gene synthesis by selective amplification of dna pools from high-fidelity microchips,"; Nature biotechnology, vol. 28, No. 12, pp. 1295-1299 (2010).
J. Quan, et al.; "Parallel on-chip gene synthesis and application to optimization of protein expression,"; Nature biotechnology, vol. 29, No. 5, pp. 449-452 (2011).
P. A. Carr, et al.; "Protein-mediated error correction for de novo dna synthesis,"; Nucleic acids research, vol. 32, No. 20, pp. e162-e162 (2004).
B. F. Binkowski, et al.; "Correcting errors in synthetic dna through consensus shuffling,"; Nucleic acids research, vol. 33, No. 6, pp. e55-e55 (2005).
W. Wan, et al.; "Error removal in microchip-synthesized dna using immobilized muts,"; Nucleic acids research, p. gku405 (2014).
J. Smith, et al.; "Removal of polymerase-produced mutant sequences from pcr products,"; Proceedings of the National Academy of Sciences, vol. 94, No. 13, pp. 6847-6850 (1997).
M. Fuhrmann, et al.; "Removal of mismatched bases from synthetic genes by enzymatic mismatch cleavage,"; Nucleic acids research, vol. 33, No. 6, pp. e58-e58 (2005).
B. J. Till, et al.; "Mismatch cleavage by single-strand specific nucleases,"; Nucleic Acids Research, vol. 32, No. 8, pp. 2632-2641 (2004).
C. A. Oleykowski, et al.; "Mutation detection using a novel plant endonuclease,"; Nucleic acids research, vol. 26, No. 20, pp. 4597-4602 (1998).
I. Saaem, et al.; "Error correction of microchip synthesized genes using surveyor nuclease,"; Nucleic acids research, p. gkr887 (2011).
P. R. Dormitzer, et al.; "Synthetic generation of influenza vaccine viruses for rapid response to pandemics,"; Science translational medicine, vol. 5, No. 185, pp. 185ra68-185ra68 (2013).

(56) References Cited

OTHER PUBLICATIONS

M. Matzas, et al.; "Highfidelity gene synthesis by retrieval of sequence-verified dna identified using high-throughput pyrosequencing,"; Nature biotechnology, vol. 28, No. 12, pp. 1291-1294 (2010).
H. Lee, et al.; "A high-throughput optomechanical retrieval method for sequence-verified clonal dna from the ngs platform,"; Nature communications, vol. 6 (2015).
H. Kim, et al.; "shotgun dna synthesis' for the high-throughput construction of large dna molecules,"; Nucleic acids research, p. gks546 (2012).
J. J. Schwartz, et al.; "Accurate gene synthesis with tag-directed retrieval of sequence-verified dna molecules,"; Nature methods, vol. 9, No. 9, pp. 913-915 (2012).
R. Higuchi, et al.; "A general method of in vitro preparation and specific mutagenesis of dna fragments: study of protein and dna interactions,"; Nucleic acids research, vol. 16, No. 15, pp. 7351-7367 (1988).
R. Jansen, et al.; "Identification of genes that are associated with dna repeats in prokaryotes,"; Molecular microbiology, vol. 43, No. 6, pp. 1565-1575 (2002).
F. Sanger, et al.; "DNA sequencing with chainterminating inhibitors,"; Proc. Natl. Acad. Sci. U.S.A., vol. 74, No. 12, pp. 5463-5467 (Dec. 1977).
E. S. Lander, et al.; "Initial sequencing and analysis of the human genome,"; Nature, vol. 409, No. 6822, pp. 860-921 (Feb. 2001).
R. H. Waterston, et al.; "Initial sequencing and comparative analysis of the mouse genome,"; Nature, vol. 420, No. 6915, pp. 520-562 (Dec. 2002).
D. A. Wheeler, et al.; "The complete genome of an individual by massively parallel DNA sequencing,"; Nature, vol. 452, No. 7189, pp. 872-876 (Apr. 2008).
P. A. Pevzner, et al.; "An Eulerian path approach to DNA fragment assembly,"; Proc. Natl. Acad. Sci. U.S.A., vol. 98, No. 17, pp. 9748-9753 (Aug. 2001).
J. Brakensiek, et al.; "Efficient low-redundancy codes for correcting multiple deletions,"; arXiv preprint arXiv:1507.06175 (2015).
E. Brill, et al.; "An improved error model for noisy channel spelling correction,"; Proceedings of the 38th Annual Meeting on Association for Computational Linguistics. Association for Computational Linguistics, pp. 286-293 (2000).
D. Cullina, et al.; "An improvement to levenshtein's upper bound on the cardinality of deletion correcting codes,"; IEEE Transactions on Information Theory, vol. 60, No. 7, pp. 3862-3870 (2014).
F. J. Damerau; "A technique for computer detection and correction of spelling errors," Commun. ACM, vol. 7, No. 3, pp. 171-176 Available: http://doi.acm.org/10.1145/363958.363994 (Mar. 1964).
R. Gabrys, et al.; "Graded bit-error-correcting codes with applications to flash memory,"; IEEE Transactions on Information Theory, vol. 59, No. 4, pp. 2315-2327 (2013).
A. S. Heiberg, et al.; "On multiple insertion/deletion correcting codes," Information Theory, IEEE Transactions on, vol. 48, No. 1, pp. 305-308 (2002).
S. Kumar, et al.; "Mega3: integrated software for molecular evolutionary genetics analysis and sequence alignment,"; Briefings in bioinformatics, vol. 5, No. 2, pp. 150-163 (2004).
V. I. Levenshtein; "Binary codes capable of correcting deletions, insertions, and reversals," in Soviet physics doklady, vol. 10, No. 8, pp. 707-710 (1966).
F. Paluncic, et al.; "A note on non-binary multiple insertion/deletion correcting codes," in IEEE Information Theory Workshop (2011).
F. Sala, et al.; "Exact reconstruction from insertions in synchronization codes,"; arXiv preprint, arXiv:1604.03000 (2016).
C. Schoeny, et al.; "Codes for correcting a burst of deletions or insertions,"; arXiv preprint, arXiv:1602.06820 (2016).
L. J. Schulman; "Asymptotically good codes correcting insertions, deletions, and transpositions,"; IEEE transactions on Information theory, vol. 45, No. 7, pp. 2552-2557 (1999).
N. J. Sloane; "On single-deletion-correcting codes,"; Codes and Designs, de Gruyter, Berlin, pp. 273-291 (2002).

M. M. Vilenchik; "Endogenous dna double-strand breaks: production, fidelity of repair, and induction of cancer,"; Proceedings of the National Academy of Sciences, vol. 100, No. 22, pp. 12871-12876 (2003).
J. Wolf; "On codes derivable from the tensor product of check matrices,"; IEEE Transactions on Information Theory, vol. 11, No. 2, pp. 281-284 (1965).
L.M. Adleman; "Molecular computation of solutions to combinatorial problems,"; Science, vol. 266, pp. 1021-1024 (Nov. 1994).
D. Boneh, et al.; "Breaking DES using a molecular computer,"; Technical Report CS-TR-489-95, Department of Computer Science, Princeton University (1995).
R.S. Braich, et al.; "Solution of a 20-variable 3-SAT problem on a DNA computer,"; Science, vol. 296, pp. 492-502 (Apr. 2002).
K. Breslauer, et al.; "Predicting DNA duplex stability from the base sequence,"; Proc. Natl. Acad. Sci. USA, vol. 83, pp. 3746-3750 (1986).
P. Clote, et al.; "Computational Molecular Biology—An Introduction,"; Wiley Series in Mathematical and Computational Biology, New York (2000).
A. D'yachkov, et al.; "Exordium for DNA codes,"; J. Comb. Optim., vol. 7, No. 4, pp. 369-379 (2003).
A. D'yachkov, et al.; "New results on DNA codes,"; Proc. IEEE Int. Symp. Inform. Theory (ISIT'05), Adelaide, Australia, pp. 283-287 (Sep. 2005).
P. Gaborit, et al.; "Linear constructions for DNA codes,"; Theoretical Computer Science, vol. 334, No. 1-3, pp. 99-113 (Apr. 2005).
C.H. Cooke, et al.; "Polynomial construction of complex Hadamard matrices with cyclic core,"; Applied Mathematics Letters, vol. 12, pp. 87-93 (1999).
O.D. King; "Bounds for DNA codes with constant GC-content,"; The Electronic Journal of Combinatorics, vol. 10, No. 1, #R33 (2003).
M. Mansuripur, et al.; "Information storage and retrieval using macromolecules as storage media,"; University of Arizona Technical Report (2003).
A. Marathe, et al.; "On combinatorial DNA word design,"; J. Comput. Biol., vol. 8, pp. 201-219 (2001).
S. Mneimneh; "Computational Biology Lecture 20: RNA secondary structures,"; available online at engr.smu.edu/»saad/courses/cse8354/lectures/lecture20.pdf.
O. Milenkovic; "On the generalized Hamming weight enumerators and coset weight distributions of even isodual codes,"; Proceedings of the 2001 IEEE International Symposium on Information Theory (Jun. 29, 2001).
O. Milenkovic, et al.; "DNA codes that avoid secondary structures," Proc. IEEE Int. Symp. Inform. Theory (ISIT'05), Adelaide, Australia, pp. 288-292 (Sep. 2005).
R. Nussinov, et al.; "Fast algorithms for predicting the secondary structure of single stranded RNA,"; Proc. Natl. Acad. Sci. USA, vol. 77, No. 11, pp. 6309-6313 (1980).
V. Rykov, et al.; "DNA sequences and quaternary cyclic codes," Proc. IEEE Int. Symp. Inform. Theory (ISIT'01), Washington DC, p. 248 (Jun. 2001).
M.N. Stojanovic, et al.; "A deoxyribozyme-based molecular automaton,"; Nature Biotechnology vol. 21, pp. 1069-1074 (2003).
M. SvanstrÅom, et al.; "Bounds and constructions for ternary constant-composition codes,"; IEEE Trans. Inform. Theory, vol. 48, No. 1, pp. 101-111 (Jan. 2002).
S. Tsaftaris, et al.; "DNA computing from a signal processing viewpoint,"; IEEE Signal Processing Magazine, pp. 100-106 (Sep. 2004).
K.K. Tzeng, et al.; "On extending Goppa codes to cyclic codes," IEEE Trans. Inform. Theory, vol. IT-21, pp. 712-716 (Nov. 1975).
E. Winfree, "DNA computing by self-assembly," The Bridge, vol. 33, No. 4, pp. 31-38 (2003); Also available online at http://www.dna.caltech.edu/Papers/FOE 2003 final.pdf.
M. Zuker; "Mfold web server for nucleic acid folding and hybridization prediction,"; Nucleic Acids Res., vol. 31, No. 13, pp. 3406-3415 (2003) Web access at http://www.bioinfo.rpi.edu/»zukerm/rna/.

(56) References Cited

OTHER PUBLICATIONS

R. Gabrys, et al.; "Codes in the Damerau Distance for Deletion and Adjacent Transposition Correction"; arXiv:1601.06885, published to arxiv.org on Sep. 6, 2016.
Abroshan, et al., "Coding for deletion channels with multiple traces," arXiv e-prints, p. arXiv:1905.08197, May 2019.
Acharya, et al.; "On reconstructing a string from its substring compositions,"; Proc. IEEE Intl. Symp. Inform. Theory; IEEE; pp. 1238-1242 (2010).
Alon, et al., "Simple constructions of almost k-wise independent random variables," Random Structures & Algorithms, vol. 3, No. 3, pp. 289-304, 1992.
Ban, et al., "Beyond trace reconstruction: Population recovery from the deletion channel," arXiv e-prints, p. arXiv:1904.05532, Apr. 2019.
Barvinok; "A polynomial time algorithm for counting integral points in polyhedra when the dimension is fixed,"; Mathematics of Operations Research, vol. 19, No. 4, pp. 769-779 (1994).
Batu, et al., "Reconstructing strings from random traces," in Proceedings of the 15th Annual ACM-SIAM Symposium on Discrete Algorithms (SODA), 2004, pp. 910-918.
Benenson, et al.; "An autonomous molecular computer for logical control of gene expression,"; Nature, vol. 429, pp. 423-429 (May 2004).
Bertalmio et al., "Image Inpainting", in Proceedings of the 27th annual conference on Computer graphics and Interactive techniques. ACM Press/Addison-Wesley Publishing Co., 2000, pp. 417-424.
Chase, "New lower bounds for trace reconstruction," arXiv e-prints, p. arXiv:1905.03031, May 2019.
Cheng, et al, "Deterministic document exchange protocols, and almost optimal binary codes for edit errors," in 2018 IEEE 59th Annual Symposium on Foundations of Computer Science (FOCS), Oct. 2018, pp. 200-211.
Davies, et al., "Reconstructing trees from traces," arXiv e-prints, p. arXiv:1902.05101, Feb. 2019.
De, at al., "Optimal mean-based algorithms for trace reconstruction," in Proceedings of the 49th Annual ACM SIGACT Symposium on Theory of Computing (STOC), 2017, pp. 1047-1056.
Gabrys et al., "The hybrid k-deck problem: Reconstructing sequences from short and long traces," in 2017 IEEE International Symposium on Information Theory (ISIT), Jun. 2017, pp. 1306-1310.
Gabrys, et al., "Sequence reconstruction over the deletion channel," IEEE Transactions on Information Theory, vol. 64, No. 4, pp. 2924-2931, Apr. 2018.
Gabrys, et al., "Unique reconstruction of coded sequences from multiset substring spectra," in 2018 IEEE International Symposium on Information Theory (ISIT), Jun. 2018, pp. 2540-2544.
Goldman, et al., "Towards practical, high-capacity, low-maintenance information storage in synthesized DNA," Nature, vol. 494, No. 7435, p. 77, 2013.
Guruswami, et al., Essential Coding Theory, 2018, draft available at https://cse buffalo.edu/faculty/atri/courses/coding-theory/book.
Haeupler et al., "Repeated deletion channels," in 2014 IEEE Information Theory Workshop (ITW), Nov. 2014, pp. 152-156.
Haeupler, "Optimal document exchange and new codes for insertions and deletions," arXiv e-prints, p. arXiv:1804.03604, Apr. 2018.
Heckel, et al., "Fundamental limits of DNA storage systems," in 2017 IEEE International Symposium on Information Theory (ISIT), Jun. 2017, pp. 3130-3134.
Heinrich; "Path decompositions,"; Le Matematiche, vol. 47, No. 2, pp. 241-258 (1993).
Holden et al, "Lower bounds for trace reconstruction," arXiv e-prints, p. arXiv:1808.02336, Aug. 2018.
Holden, et al., "Subpolynomial trace reconstruction for random strings and arbitrary deletion probability," arXiv e-prints, p. arXiv:1801.04783, Jan. 2018.
Holenstein, et al., "Trace reconstruction with constant deletion probability and related results," in Proceedings of the 19th Annual ACM-SIAM Symposium on Discrete Algorithms (SODA), 2008, pp. 389-398.
Horovitz, et al., "Reconstruction of sequences over non-identical channels," IEEE Trans-actions on Information Theory, vol. 65, No. 2, pp. 1267-1286, Feb. 2019.
Kovacevic et al., "Codes in the space of multisets—Coding for permutation channels with Impairments," IEEE Transactions on Information Theory, vol. 64, No. 7, pp. 5156-5169, Jul. 2018.
Krishnamurthy, et al., "Trace reconstruction: Generalized and parameterized," arXiv e-prints, p. arXiv:1904.09618, Apr. 2019.
Lenz, et al., "Coding over sets for DNA storage," in 2018 IEEE International Symposium on Information Theory (ISIT), Jun. 2018, pp. 2411-2415.
Letsinger, et al.; "Oligonucleotide synthesis on a polymer support1, 2," Journal of the American Chemical Society, vol. 87, No. 15, pp. 3526-3527 (1965).
Letsinger, et al.; "Synthesis of thymidine oligonucleotides by phosphite triester intermediates,"; Journal of the American Chemical Society, vol. 98, No. 12, pp. 3655-3661 (1976).
Letsinger, et al; "Synthesis of oligothymidylates via phosphotriester intermediates,"; Journal of the American Chemical Society, vol. 91, No. 12, pp. 3350-3355 (1968).
Levenshtein, "Efficient reconstruction of sequences," IEEE Trans-actions on Information Theory, vol. 47, No. 1, pp. 2-22, Jan. 2001.
Magner, et al., "Fundamental bounds for sequence reconstruction from nanopore sequencers," IEEE Transactions on Molecular, Biological and Multi-Scale Communications, vol. 2, No. 1, pp. 92-106, Jun. 2016.
McGregor, et al., "Trace reconstruction revisited," in Algorithms—ESA 2014, A. S. Schulz and D. Wagner, Eds. Berlin, Heidelberg: Springer Berlin Heidelberg, 2014, pp. 689-700.
Milenkovic, et al, "Exabytes in a test tube," IEEE Spectrum, vol. 55, No. 5, pp. 40-45, 2018.
Nazarov et al., "Trace reconstruction with exp(O(n1/3)) samples," in Proceedings of the 49th Annual ACM SIGACT Symposium on Theory of Computing (STOC), 2017, pp. 1042-1046.
Notice of Allowance, U.S. Appl. No. 15/356,118, dated Sep. 16, 2019 [16-1614].
Office Action, U.S. Appl. No. 15/356,118, dated May 3, 2019 [16-1614].
Office Action, U.S. Appl. No. 15/356,118, dated Jul. 19, 2019 [16-1614].
Organick, et al., "Random access in large-scale DNA data storage," Nature biotechnology, vol. 36, No. 3, p. 242, 2018.
Peres et al, "Average-case reconstruction for the deletion channel: subpolynomially many traces suffice," arXiv e-prints, p. arXiv:1708.00854, Aug. 2017.
Pevzner, et al.; "Towards DNA sequencing chips,"; in Mathematical Foundations of Computer Science 1994. Springer, pp. 143-158 (1994).
Ruskey, et al.; "De Bruijn sequences for fixed-weight binary strings,"; SIAM Journal on Discrete Mathematics, vol. 26, No. 2, pp. 605-617 (2012).
Schouhamer Immink et al., "Very efficient balanced codes," IEEE Journal on Selected Areas in Communications, vol. 28, No. 2, pp. 188-192, Feb. 2010.
Shinkar, et al., "Clustering-correcting codes," arXiv e-prints, p. arXiv:1903.04122, Mar. 2019.
Shomorony et al, "Capacity results for the noisy shuffling channel," arXiv e-prints, p. arXiv:1902.10832, Feb. 2019.
Song, et al., "Sequence-subset distance and coding for error control in DNA-based data storage," arXiv e-prints, p. arXiv:1809.05821, Sep. 2018.
Srinivasavaradhan, et al, "On maximum likelihood reconstruction over multiple deletion channels," in 2018 IEEE International Symposium on Information Theory (ISIT), Jun. 2018, pp. 436-440.
Tabatabaei Yazdi, et al, "Mutually uncorrelated primers for DNA-based data storage," IEEE Transactions on Information Theory, vol. 64, No. 9, pp. 6283-6296, Sep. 2018.
Tan, et al.; "Sets represented as the length-n factors of a word,"; in Combinatorics on Words; Springer; pp. 250-261 (2013).

(56) References Cited

OTHER PUBLICATIONS

Tavares; "A study of synchronization techniques for binary cyclic codes,"; Ph.D. dissertation, Thesis (Ph. D.)—McGill University (1968).
Zhirnov et al., Nucleic Acid Memory, Nat. Mater. Apr. 2016; 15(4):366-370. doi:10.1038/nmat4594.

* cited by examiner

DNA-BASED IMAGE STORAGE AND RETRIEVAL

CROSS-REFERENCE TO RELATED APPLICATION

This application claims priority to U.S. provisional patent application no. 62/951,105, filed Dec. 20, 2019, which is hereby incorporated by reference in its entirety.

STATEMENT REGARDING FEDERALLY SPONSORED RESEARCH OR DEVELOPMENT

This invention was made with government support under Grant No. AF894_019_000_20190116151220 awarded by Defense Advanced Research Projects Association. The government has certain rights in the invention.

BACKGROUND

The main obstacles for the practical deployment of deoxyribonucleic acid (DNA) based data storage platforms are the prohibitively high cost of synthetic DNA and the large number of errors introduced during synthesis. In particular, synthetic DNA products contain both individual oligo (nucleotide fragment) symbol errors as well as missing DNA oligo errors, with rates that exceed those of modern storage systems by orders of magnitude. These errors can be corrected either through the use of a large number of redundant oligos or through cycles of writing, reading, and rewriting of information that eliminate the errors. Both approaches add to the overall storage cost and are hence undesirable.

SUMMARY

The embodiments herein store quantized images in DNA and use signal processing and machine learning techniques to deal with error and cost issues without resorting to the use of redundant oligos or rewriting. These embodiments rely on decoupling the red-green-blue (RGB) channels of images, performing specialized quantization and compression on the individual color channels, and using new discoloration detection and image inpainting techniques. The performance of this approach is shown experimentally on a collection of movie posters stored in DNA, and establishes the efficacy thereof.

Accordingly, a first example embodiment may involve: (i) obtaining an image composed of color channels including a red color channel, a green color channel, and a blue color channel, wherein each of the color channels represents colors therein with n bits per pixel; (ii) quantizing each of the color channels to be represented by m bits per pixel, wherein m is less than n; (iii) using a space-filling curve to convert each of the color channels as quantized into respective vectors including a red channel vector, a green channel vector, and a blue channel vector, wherein entries in each of the respective vectors are represented by m bits; (iv) generating, for each of the respective vectors, a respective set of m arrays, wherein the m arrays for a particular vector of the respective vectors contain indices of where a fixed value selected from a range of 0 to m−1 is found in the particular vector, and wherein the indices are in increasing order; (v) applying, to each of the m arrays for each of the respective vectors, differential encoding of the indices therein; (vi) compressing each of the m arrays for each of the respective vectors; (vii) mapping each of the m arrays for each of the respective vectors to blocks of nucleotides, wherein each block contains a unique block identifier representing a location in the m arrays of the respective vectors; (viii) synthesizing the blocks of nucleotides; and (ix) storing, in a DNA-based storage medium, the blocks of nucleotides.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
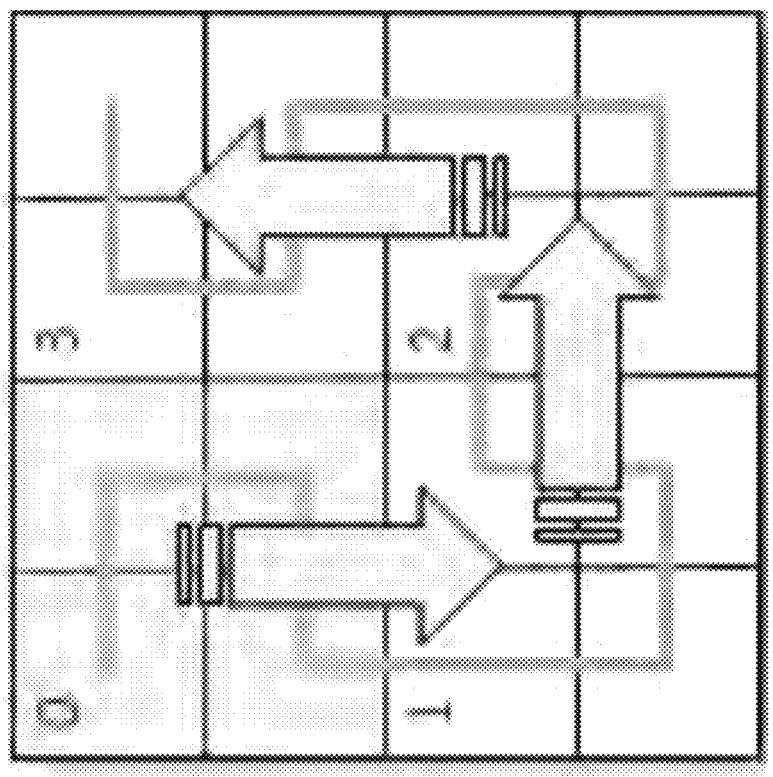
FIG. 1 illustrates Hilbert curves for 2×2 and 4×4 squares, in accordance with example embodiments.
Figure 1:
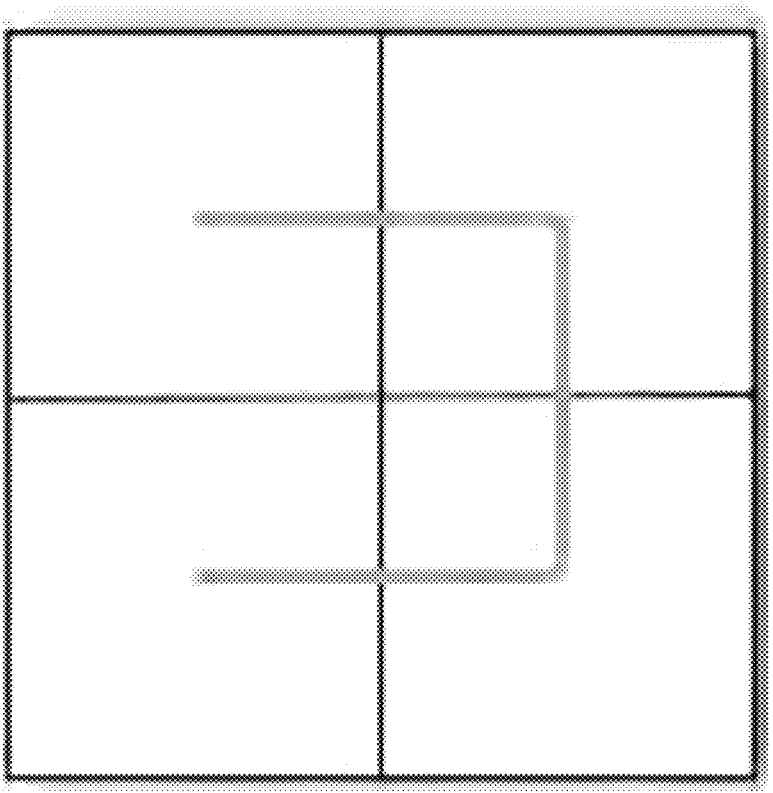

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

DNA-based data storage has recently emerged as a viable alternative to classical storage devices that can be used to record bits at a nanoscale level and preserve them in a nonvolatile fashion for thousands of years. Representative DNA-based storage technology has been described in U.S. patent application Ser. Nos. 15/356,118 and 15/789,519, both of which are incorporated by reference in their entirety herein.

Almost all existing DNA-based data recording architectures store user content in synthetic DNA strands of length 100-1000 base pairs, organized within large unordered pools, and retrieve desired information via next-generation (e.g., HiSeq and MiSeq) or third-generation nanopore sequencing. Although DNA sequencing can be performed at a very low cost, de novo synthesis of DNA oligos with a predetermined content still represents a major bottleneck of the platform. Synthetic DNA platforms are prohibitively expensive compared to existing optical and magnetic media. Furthermore, synthetic DNA-based storage systems have error-rates of the order of $10^{-3}$ that by far exceed those of existing high-density recorders. Synthesis errors include both symbol errors as well as missing oligo errors which are unique to this type of storage media and refer to the fact that one may not be able to cover all substrings of the user-defined string. Missing oligos represent serious obstacles to accurate data retrieval as they may affect more than 20% of the product. To address this type of error, proposals have included using Reed-Solomon codes at both the oligo and pool of oligo level to ensure that missing strings may be reconstructed from combinations of redundantly encoded oligos. Unfortunately, adding redundant oligos further increases the cost of the system as the oligos have to be sequenced to determine the missing oligo rate in order to add the correct amount of redundancy.

The embodiments herein cover a new means of archiving images in DNA in which the missing and erroneous oligos are corrected through specialized learning methods, rather than expensive coding redundancy. First, colored images are quantized and compressed by specialized encoding methods that separately operate on the three color channels, red, green, and blue (herein after "RGB"). The quantization scheme reduces the image color pallet to 8 intensity levels per channel, and compresses intensity levels through a combination of Hilbert-space filling curves, differential and Huffman coding. In some embodiments, less quantization and more intensity levels (e.g., 16, 32, 64, 128) may be used.

Given that compression may lead to catastrophic error-propagation in the presence of missing or mismatched oligos, sparsely spaced markers are also introduced into the oligo codes in order to resynchronize positional pixel information when this is lost. No error-correcting redundancy is added to the pool in order to further save in synthesis cost, and instead, the retrieved corrupted images are subjected to specialized image processing techniques that lead to barely distorted outputs. The scheme combines automatic detection of discolorations in images with inpainting based on EdgeConnect and smoothing via bilateral filtering. The proposed DNA image processing scheme was tested on a pool of 11,826 oligos of length 196 basepairs each, purchased from Integrated DNA Technologies (IDT).

II. THE COLOR IMAGE ENCODING PROCEDURE

The two-step encoding procedure first translates an image file into 24 binary strings, and then converts the binary strings into DNA oligos for storage and amplification. A detailed description of each step used in the process is provided below.

Converting image files to binary strings. The first step in the procedure is RGB channel separation and quantization. First, the color images are split into three color channels, red (R), green (G), and blue (B), and then 3-bit quantization is performed on the values in each channel. More precisely, the image I is represented by a three-dimension tensor of size m×n×3, i.e., $I \in [256]^{m \times n \times 3}$, which is split into three matrices R, G, B of size m×n each. Next, 3-bit quantization of each color matrix is performed, leading to intensity values mapped from 0-255 to 0-7. More specifically, the following quantization rule is used for all three channels:

$$X[p, q] = \text{floor}\left(\frac{X[p, q] \times 8}{256}\right) \forall\, p \in [m], q \in [n],$$

where $X \in [8]^{m \times n}$ is the quantized matrix for $X \in \{R, G, B\}$.

Converting 2D images into 1D oligo strings. There exist several methods for converting a matrix into a string so as to nearly-optimally preserve two dimensional image distances in the one dimensional domain, such as the Hilbert and Peano space-filling curve. The Hilbert space-filling curve, shown in FIG. 1, provides a good means to capture two dimensional locality and is the method of choice in the conversion process. Note that the Hilbert curve is used on square images, so the transversal implementation is adapted to account for matrices with arbitrary dimensions. After the mapping, the matrices R, G, B are converted into vectors $V_R$, $V_G$, $V_B$, respectively.

Partitioning color channels according to levels. Upon quantization, the values in $V_R$, $V_G$, $V_B$ lie in $\{0, \ldots, 7\}$. Next, each vector is decomposed into strings of possibly different lengths according to the intensity value. Specifically, $V_R$ is decomposed into $L_{R,0}, \ldots, L_{R,7}$, where the vector $L_{R,j}$ contains the indices of the elements in $V_R$ whose value equals j, $j \in [8]$; the same procedure is performed for the vectors $V_G$, $V_B$. An example decomposition may read as:

$$V_R = [0, 0, 0, 1, 7, 6, 7, 7, \ldots\,] \to \begin{array}{l} L_{R,0} = [0, 1, 2, \ldots\,] \\ \vdots \\ L_{R,7} = [4, 6, 7, \ldots\,] \end{array}$$

Note that the elements in $V_i$ are assigned to $L_{i,j}$ in order, $i \in \{R, G, B\}$, $0 \leq j \leq 7$. Hence, each vector $L_{i,j}$ contains increasing values, a fact that is exploited in the reconstruction procedure. Given the Hilbert scan, it is expected that the differences between adjacent entries in each of the vectors $L_{i,j}$ is small with high probability. Therefore, splitting a vector into individual levels enables subsequent differential encoding. Moreover, since the level information is split among different vectors, distortions can be corrected in the images in the presence of errors. In summary, after the RGB decomposition and level partition, each image is represented by 24 vectors. Differential encoding converts a string into another string containing the initial value of the original and the differences between consecutive values, summarized in vectors denoted by $D_{i,j}$. In order to prevent catastrophic error propagation, 3% of the values in each $D_{i,j}$ were set to their original undifferentiated values and prepend to the symbol -1. An additional -2 was appended to each $D_{i,j}$ to indicate the end of the vector. For example, a typical pair of $L_{i,j}$ and $D_{i,j}$ may be of the form:

$$L_{i,j} = [x_1, x_2, \ldots, x_{31}, x_{32}, \ldots\,]$$
$$\downarrow$$
$$D_{i,j} = [-1, x_1, x_2 - x_1, \ldots, -1, x_{31}, x_{32} - x_{31}, \ldots, -2].$$

Note that as $L_{i,j}$ has increasing values, the symbols -1 and -2 cannot be confused with information-bearing values in $D_{i,j}$. Huffman coding is performed after differential coding, and all values in $D_{i,j}$ are used to construct the Huffman code dictionary. This results in a collection of binary strings $B_{i,j}$, $i \in \{R, G, B\}$, $0 \leq j \leq 7$.

Conversion of binary strings into DNA oligos. The binary information is converted into oligo strings over the alphabet $\{A,T,G,C\}$ of length 196 nucleotides. Each oligo contains a unique block-id for its position in the original string. If needed, some strings are padded with dummy values to ensure uniform lengths. Once again, -2 is used to indicate the end of the vector. In addition, each DNA oligo includes a prefix primer, address, an information block and suffix primer.

Mapping binary sequences to DNA blocks. To produce a high quality of the synthetic product, constraint coding is performed by imposing a maximum runlength-3 constraint for the symbols C and G and ensuring a GC content in the range 40-60%. The constrained coder maps 18 and 22-bit sequences into 10 and 13 nucleotide DNA oligos, respectively. This constrained code, along with the color code, is the only source of redundancy in the encoding procedure.

Primer sequences. A prefix and suffix primer, used for polymerase chain reaction (herein after "PCR") amplification of the single stranded DNA oligos, is added to each DNA oligo. Eight pairs of primers of length 20, one for each level, all of which are at a Hamming distance ≥10 nucleotides, are chosen to allow for random access. The primers are paired up so as to have similar melting temperature, which allows for all oligos to be amplified in the same cycle.

Address sequences. Strings of length 13 are added to the DNA oligos following the primers in order to represent the address of the information blocks contained. The first 3 nucleotides of the address encode the color (RGB). Since color information is highly important for reconstruction, the color information is presented in redundant form as R='ATC', G='TCG', B='GAT'. This allows for single-error correction in the color code. The second part of the address is of length 10 nucleotides, encoding an 18-bit binary string including the index of the corresponding image file, the index of the color level and the index of the information block within that level.

Figure 2:
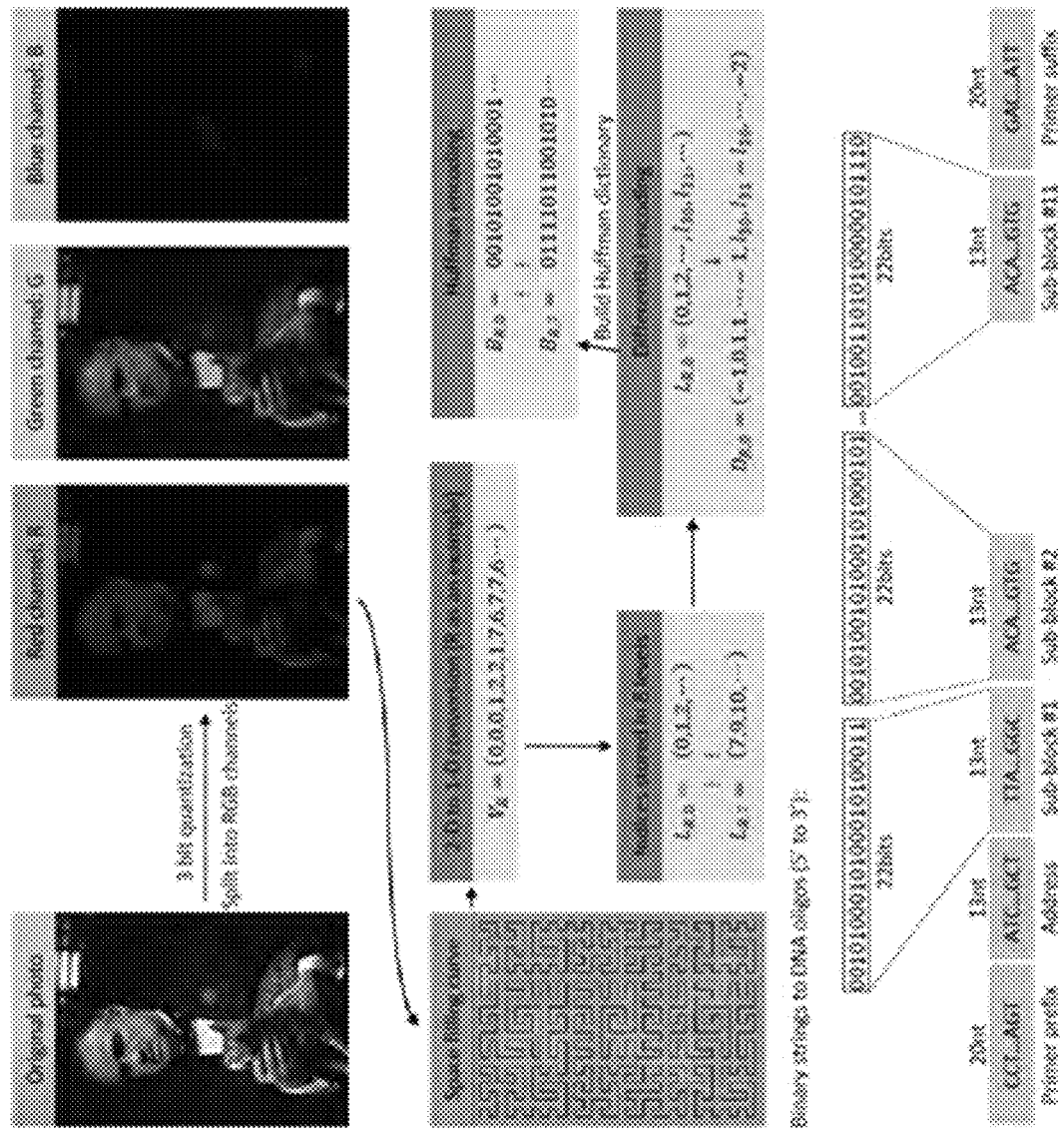
FIG. 2 illustrates a schematic drawing of the encoding procedure, in accordance with example embodiments.

Information blocks are added to the oligos between the address and suffix primer, including 11 blocks of length 13 nucleotides. The total length of the information block is 143 nucleotides. Overall, with the compression scheme and additional addressing information added, 8,654,400 bits of the original images are converted into 2,317,896 nucleotides. The encoding steps are summarized in FIG. 2.

III. DNA IMAGE PROCESSING AND EXPERIMENTS

The 11,826 DNA oPools oligos were ordered from IDT. They were PCR-amplified and the PCR products were then converted into a shotgun sequencing library with the Hyper Library construction kit from Kapa Biosystems (Roche). The library was quantitated by a quantitative polymerase chain reaction (qPCR) and sequenced on one ISeq flow cell for 251 cycles from one end of the fragments. The fast file was generated with the Illumina bcl2fastq v2.20 conversion software. As each oligo read may contain errors that arise both during synthesis and sequencing, a consensus sequence was first reconstructed via sequence alignment to exploit the inherent redundancy of the read process. After the whole writing, reading and consensus process, 10,981 perfectly reconstructed oligos were obtained, 745 oligos with symbol errors that do not cause obvious defects in the reconstructed images, and 100 oligos with large corruption levels or completely missing from the pool.

The decoding procedure operates on the consensus reads and reverses the two-step encoding process.

Converting DNA consensus strings into binary strings. During the conversion of DNA consensus strings to binary strings, if some oligo unique identifiers are corrupted by errors during the synthesis or sequencing process, the erroneous identifier is replaced by a unique string at smallest Hamming distance from it. Each DNA block is converted into some binary string, although this string may be wrong and cause visible discolorations in the image.

Figure 3:
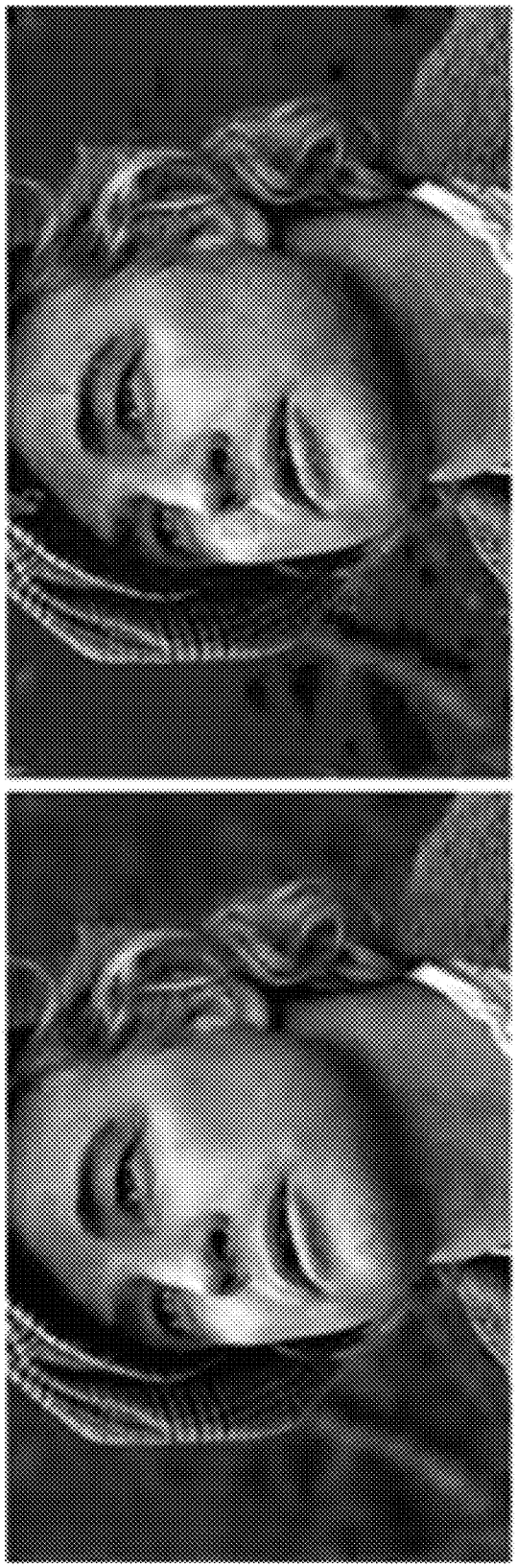
FIG. 3 illustrates an original image compared to a reconstructed image with discolorations, in accordance with example embodiments.

Image processing. An example illustrating the image corruptions caused by erroneous/missing oligos is shown in FIG. 3. Small blocks, only 10 missing oligos, with the wrong color can be easily observed visually. The discolorations can be corrected automatically with a three-part image processing procedure. The first step is detecting the locations with discolorations, masking the regions with discolorations and subsequently treating them as missing pixels. The second step involves using deep learning techniques to inpaint the missing pixels. The third step involves smoothing the image to reduce both blocking effects caused by aggressive quantization and the mismatched inpainted pixels.

Automatic discoloration detection. Detecting arbitrarily shaped discolorations is a difficult problem in computer vision that has not been successfully addressed for classical image processing systems. This is due to the fact that discolored pixels usually have simultaneous distortions in all three color channels of possibly different degrees. However, detecting discolorations in DNA-encoded images is possible since, with high probability, only one of the three color channels will be corrupted due to independent encoding of the RGB components and these components not necessarily being close to each other when stored. Thus, when two of the three channels are smooth in a particular region and the third channel is not smooth in that region (e.g., with pixel values that vary by more than a predetermined extent), the variations in the third channel are likely due to error. Thus, the third channel can be smoothed to improve the color quality of the image in the region.

Figure 4:
FIG. 4 illustrates non-overlapping errors in different color channels of the image encoded in DNA, in accordance with example embodiments.
Figure 5A:
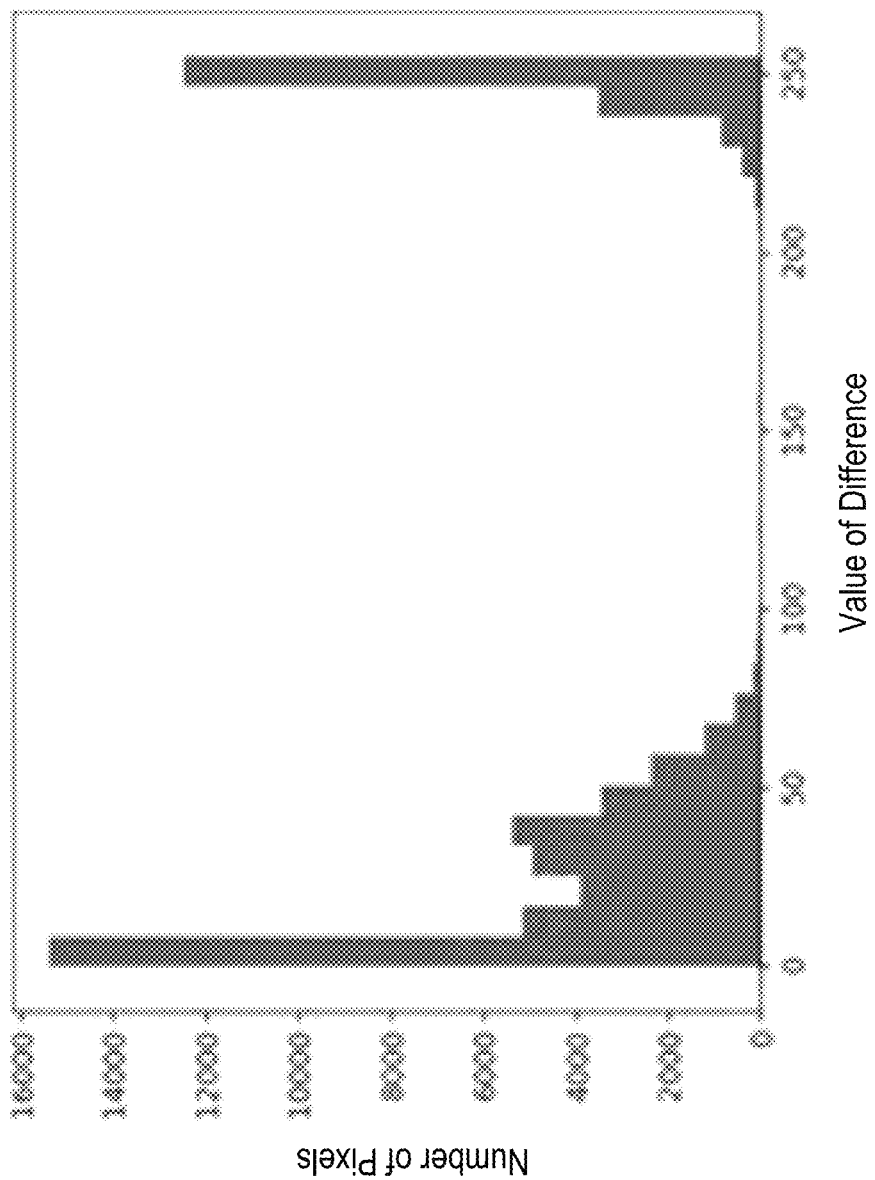
FIG. 5A is a histogram of the values in the matrix R-G, in accordance with example embodiments.
Figure 5C:
FIG. 5C is an illustration of discolored regions in the red channel of an image that have been whitened out, in accordance with example embodiments.
Figure 5E:
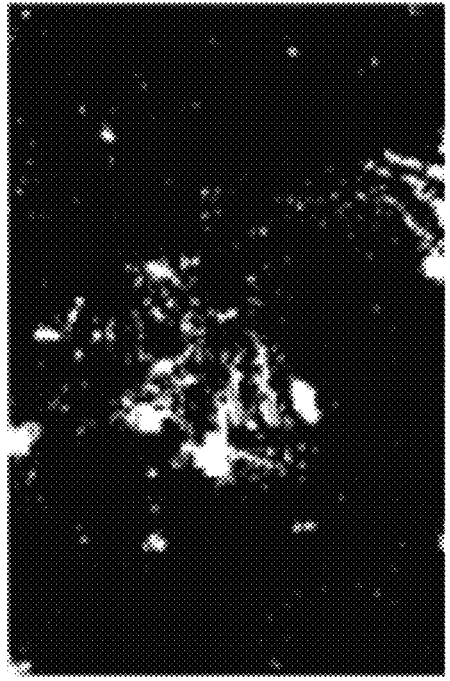
FIG. 5E is an illustration of the image of the mask, in accordance with example embodiments.
Figure 5B:
FIG. 5B is an illustration of a corrupted image, in accordance with example embodiments.
Figure 5D:
FIG. 5D is an illustration of an erroneous image reconstruction with masking, in accordance with example embodiments.

FIG. 4 illustrates this fact, as erroneous pixels in different channels do not overlap. Within the correct color channels, pixels have neighbors of similar level, while within the erroneous channel, pixels have values that differ significantly from those of their neighbors. FIGS. 5A, 5B, and 5C illustrate that pixels with the smallest t=15 frequencies in the difference vectors indeed correspond to almost all erroneous regions in the red channel. The results of the detection scheme are depicted in FIGS. 5D and 5E, for t=18. Note that the whitened out regions are treated as missing data, and filled in using inpainting techniques.

Image inpainting, or image completion, is a method for filling in missing regions in an image. There exist several methods for image inpainting currently in use, including diffusion-based, patch-based and deep learning approaches. The former two methods use local or nonlocal information only within the target image itself which leads to poor performance when trying to recover complex details in large images. On the other hand, deep-learning methods such as EdgeConnect combine edges in the missing regions with color and texture information from the remainder of the image to fill in the missing pixels. Since the encoded movie posters have obvious edge structures, the images were inpainted using EdgeConnect with the result shown in FIG. 6A.

Figure 6B:
FIG. 6B is an illustration of the image with inpainting after smoothing, in accordance with example embodiments.
Figure 6D:
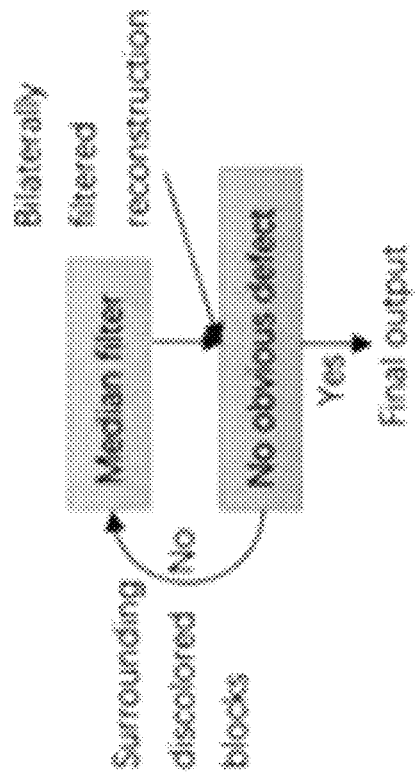
FIG. 6D illustrates a schematic drawing of the refining procedure, in accordance with example embodiments.
Figure 6A:
FIG. 6A is an illustration of the image with inpainting before smoothing, in accordance with example embodiments.
Figure 6C:
FIG. 6C is an illustration of the refined output of the inpainting procedure, in accordance with example embodiments.

Smoothing. Although the problem of discoloration may be addressed through inpainting, the reconstructed images still suffer from mismatched inpaints and blocking effect caused by quantization. To further improve the image quality, smoothing is performed through bilateral filtering that tends to preserve the edges structures. The smoothing equations read as:

$$\hat{I}[i,j] = \frac{\sum_{[k,l]\in\Omega} I[k,l]w(i,j,k,l)}{\sum_{[k,l]\in\Omega} w(i,j,k,l)},$$

$$w(i,j,k,l) = \exp\left(-\frac{(i-k)^2+(j-l)^2}{2\sigma_d^2} - \frac{\|I[i,j]-I[k,l]\|^2}{2\sigma_r^2}\right),$$

where $I$ denotes the original image and $\hat{I}$ the filtered image, $\Omega$ is some predefined window centered at the coordinates $[i, j]$, and $\sigma_r$ and $\sigma_d$ are parameters that control the smoothing differences for intensities and coordinates, respectively. The filter performs Gaussian blurring on background regions but respects edge boundaries in the image. The result of smoothing with $\sigma_d^2=\sigma_r^2=45$ and $\Omega$ of the form of a 9×9 square is shown in FIG. 6B, and no obvious discolorations are detectable. Furthermore, in order to address other possible impairments, the positions of error blocks, obtained from the discoloration detection platform, were used to perform adaptive median smoothing around erroneous regions. The output of this iterative process is illustrated in FIGS. 6C and 6D.

IV. EXAMPLE COMPUTING DEVICES AND CLOUD-BASED COMPUTING ENVIRONMENTS

The following embodiments describe architectural and operational aspects of example computing devices and systems that may employ the disclosed implementations, as well as the features and advantages thereof. Notably, at least some aspects of the embodiments herein may operate at least in part on computing devices or systems with the characteristics described below.

Figure 7:
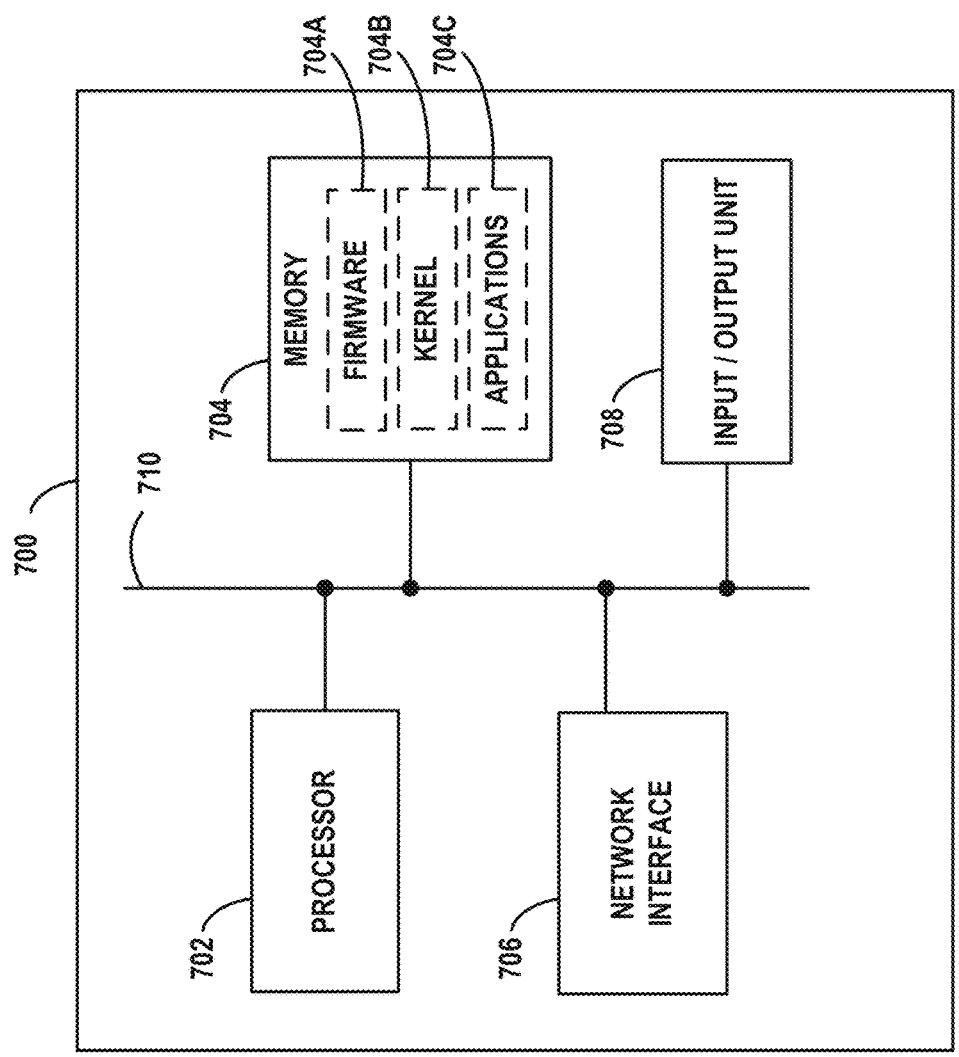
FIG. 7 illustrates a schematic drawing of a computing device, in accordance with example embodiments.

FIG. 7 is a simplified block diagram exemplifying a computing device 700, illustrating some of the components that could be included in a computing device arranged to operate in accordance with the embodiments herein. Computing device 700 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 700 includes processor 702, memory 704, network interface 706, and an input/output unit 708, all of which may be coupled by a system bus 710 or a similar mechanism. In some embodiments, computing device 700 may include other components and/or peripheral devices (e.g., detachable storage, printers, and so on).

Processor 702 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 702 may be one or more single-core processors. In other cases, processor 702 may be one or more multi-core processors with multiple independent processing units. Processor 702 may also include register memory for temporarily storing instructions being executed and related data, as well as cache memory for temporarily storing recently-used instructions and data.

Memory 704 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 700 may include fixed memory as well as one or more removable memory units, the latter including but not limited to various types of secure digital (SD) cards. Thus, memory 704 represents both main memory units, as well as long-term storage. Other types of memory may include biological memory.

Memory 704 may store program instructions and/or data on which program instructions may operate. By way of example, memory 704 may store these program instructions on a non-transitory, computer-readable medium, such that the instructions are executable by processor 702 to carry out any of the methods, processes, or operations disclosed in this specification or the accompanying drawings.

As shown in FIG. 7, memory 704 may include firmware 704A, kernel 704B, and/or applications 704C. Firmware 704A may be program code used to boot or otherwise initiate some or all of computing device 700. Kernel 704B may be an operating system, including modules for memory management, scheduling and management of processes, input/output, and communication. Kernel 704B may also include device drivers that allow the operating system to communicate with the hardware modules (e.g., memory units, networking interfaces, ports, and busses), of computing device 700. Applications 704C may be one or more user-space software programs, such as web browsers or email clients, as well as any software libraries used by these programs. Memory 704 may also store data used by these and other programs and applications.

Network interface 706 may take the form of one or more wireline interfaces, such as Ethernet (e.g., Fast Ethernet, Gigabit Ethernet, and so on). Network interface 706 may also support communication over one or more non-Ethernet media, such as coaxial cables or power lines, or over wide-area media, such as Synchronous Optical Networking (SONET) or digital subscriber line (DSL) technologies. Network interface 706 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 706. Furthermore, network interface 706 may comprise multiple physical interfaces. For instance, some embodiments of computing device 700 may include Ethernet, BLUETOOTH®, and Wifi interfaces.

Input/output unit 708 may facilitate user and peripheral device interaction with example computing device 700. Input/output unit 708 may include one or more types of input devices, such as a keyboard, a mouse, a touch screen, and so on. Similarly, input/output unit 708 may include one or more types of output devices, such as a screen, monitor, printer, and/or one or more light emitting diodes (LEDs). Additionally or alternatively, computing device 700 may communicate with other devices using a universal serial bus (USB) or high-definition multimedia interface (HDMI) port interface, for example.

In some embodiments, one or more instances of computing device 700 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

Figure 8:
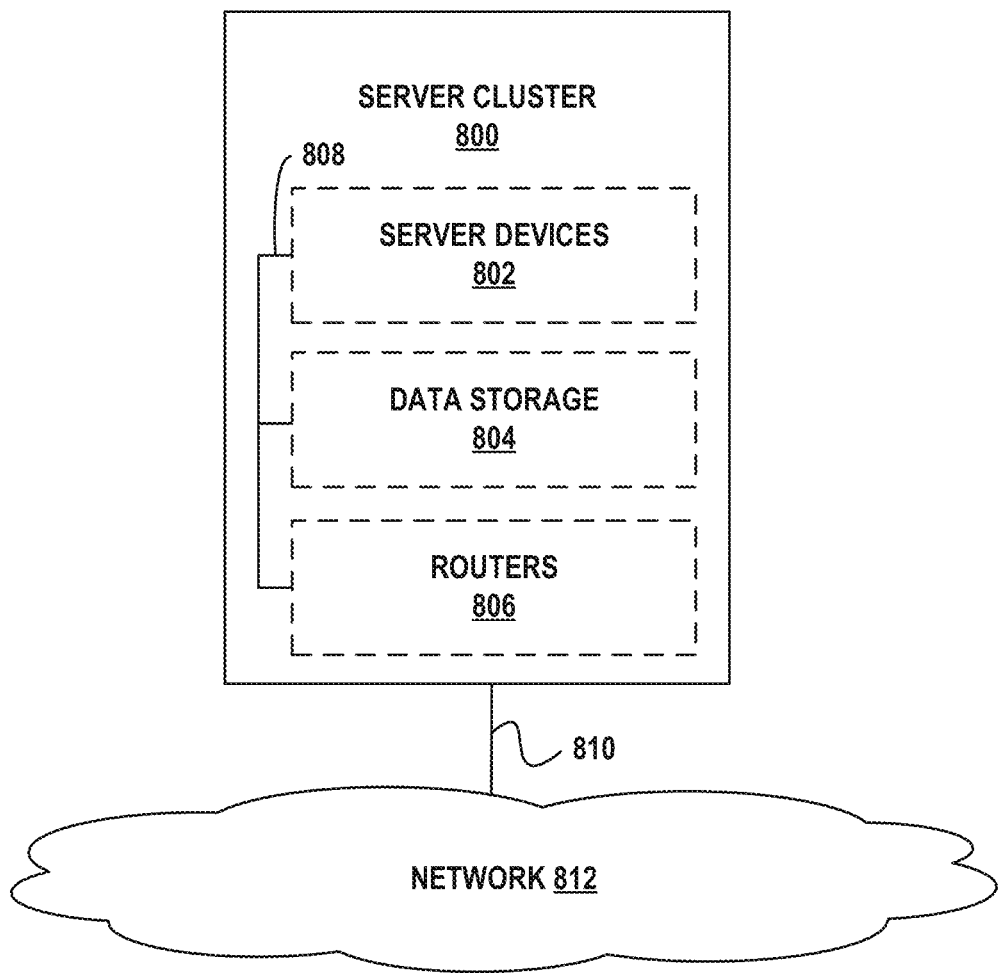
FIG. 8 illustrates a schematic drawing of a server device cluster, in accordance with example embodiments.

FIG. 8 depicts a cloud-based server cluster 800 in accordance with example embodiments. In FIG. 8, operations of a computing device (e.g., computing device 700) may be distributed between server devices 802, data storage 804, and routers 806, all of which may be connected by local cluster network 808. The number of server devices 802, data storages 804, and routers 806 in server cluster 800 may depend on the computing task(s) and/or applications assigned to server cluster 800.

For example, server devices 802 can be configured to perform various computing tasks of computing device 700. Thus, computing tasks can be distributed among one or more of server devices 802. To the extent that these computing tasks can be performed in parallel, such a distribution of tasks may reduce the total time to complete these tasks and return a result. For purpose of simplicity, both server cluster 800 and individual server devices 802 may be referred to as a "server device." This nomenclature should be understood to imply that one or more distinct server devices, data storage devices, and cluster routers may be involved in server device operations.

Data storage 804 may be data storage arrays that include drive array controllers configured to manage read and write access to groups of hard disk drives and/or solid state drives. The drive array controllers, alone or in conjunction with server devices 802, may also be configured to manage backup or redundant copies of the data stored in data storage 804 to protect against drive failures or other types of failures that prevent one or more of server devices 802 from accessing units of cluster data storage 804. Other types of memory aside from drives may be used.

Routers 806 may include networking equipment configured to provide internal and external communications for server cluster 800. For example, routers 806 may include one or more packet-switching and/or routing devices (including switches and/or gateways) configured to provide (i) network communications between server devices 802 and data storage 804 via cluster network 808, and/or (ii) network communications between the server cluster 800 and other devices via communication link 810 to network 812.

Additionally, the configuration of cluster routers 806 can be based at least in part on the data communication requirements of server devices 802 and data storage 804, the latency and throughput of the local cluster network 808, the latency, throughput, and cost of communication link 810, and/or other factors that may contribute to the cost, speed, fault-tolerance, resiliency, efficiency and/or other design goals of the system architecture.

As a possible example, data storage 804 may include any form of database, such as a structured query language (SQL) database. Various types of data structures may store the information in such a database, including but not limited to tables, arrays, lists, trees, and tuples. Furthermore, any databases in data storage 804 may be monolithic or distributed across multiple physical devices.

Server devices 802 may be configured to transmit data to and receive data from cluster data storage 804. This transmission and retrieval may take the form of SQL queries or other types of database queries, and the output of such queries, respectively. Additional text, images, video, and/or audio may be included as well. Furthermore, server devices 802 may organize the received data into web page representations. Such a representation may take the form of a markup language, such as the hypertext markup language (HTML), the extensible markup language (XML), or some other standardized or proprietary format. Moreover, server devices 802 may have the capability of executing various types of computerized scripting languages, such as but not limited to Python, PHP Hypertext Preprocessor (PHP), Active Server Pages (ASP), JavaScript, and/or other languages such as C++, C#, or Java. Computer program code written in these languages may facilitate the providing of web pages to client devices, as well as client device interaction with the web pages.

V. EXAMPLE OPERATIONS

Figure 9:
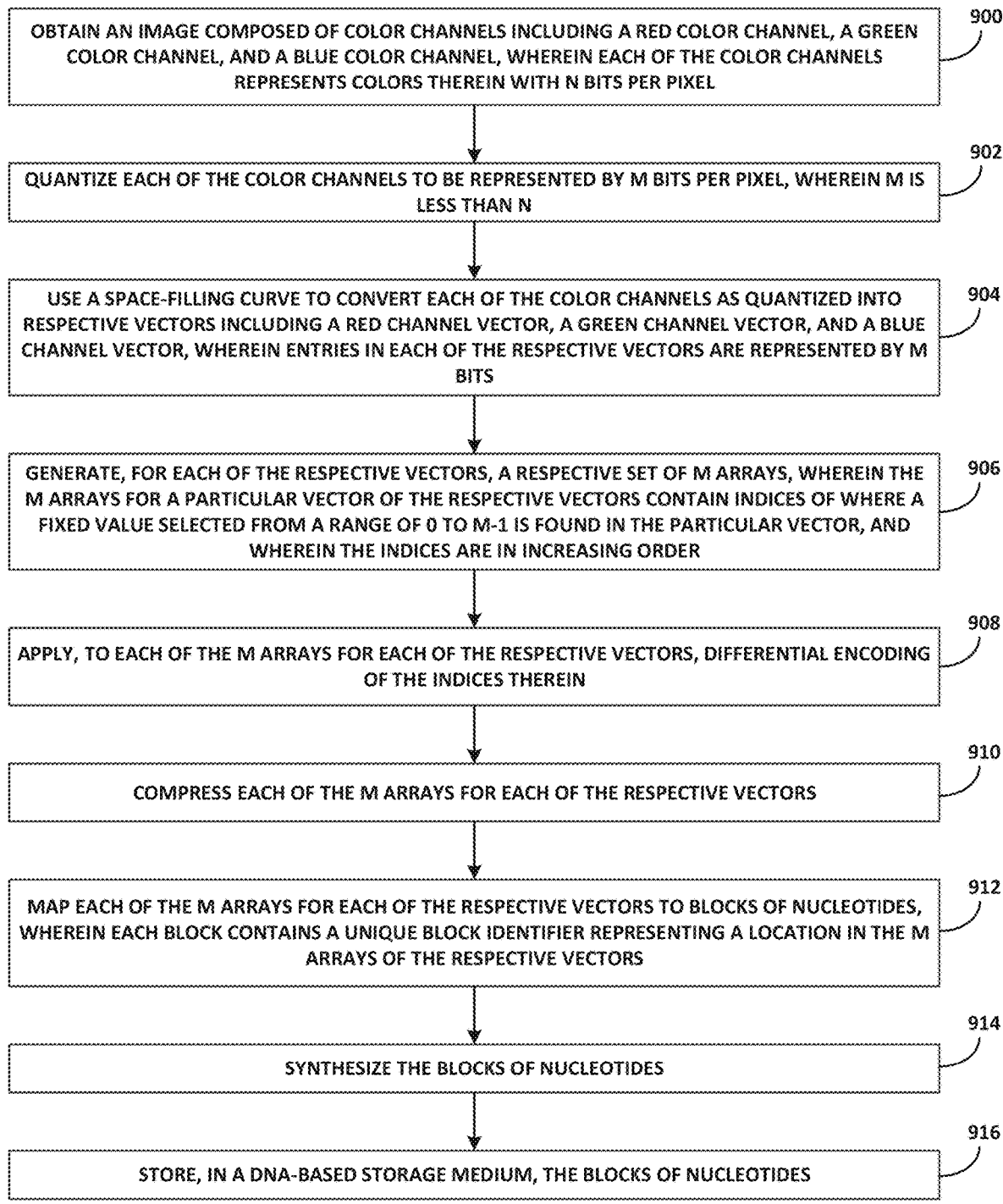
FIG. 9 is a flow chart, in accordance with example embodiments.

FIG. 9 is a flow chart illustrating an example embodiment. The process illustrated by FIG. 9 may be carried out by a computing device, such as computing device 700, and/or a cluster of computing devices, such as server cluster 800. However, the process can be carried out by other types of devices or device subsystems.

The embodiment of FIG. 9 may be simplified by the removal of any one or more of the features shown therein. For example, the embodiment may be performed without the synthesis and storing steps in some situations. Alternatively, a computing system may perform the embodiment until the synthesis and storing steps, and then instruct one or more other devices to perform those steps. Further, these embodiments may be combined with features, aspects, and/or implementations of any of the previous figures or otherwise described herein.

Block 900 may involve obtaining an image composed of color channels including a red color channel, a green color channel, and a blue color channel, wherein each of the color channels represents colors therein with n bits per pixel.

Block 902 may involve quantizing each of the color channels to be represented by m bits per pixel, wherein m is less than n.

Block 904 may involve using a space-filling curve to convert each of the color channels as quantized into respective vectors including a red channel vector, a green channel vector, and a blue channel vector, wherein entries in each of the respective vectors are represented by m bits.

Block 906 may involve generating, for each of the respective vectors, a respective set of m arrays, wherein the m arrays for a particular vector of the respective vectors contain indices of where a fixed value selected from a range of 0 to m−1 is found in the particular vector, and wherein the indices are in increasing order.

Block 908 may involve applying, to each of the m arrays for each of the respective vectors, differential encoding of the indices therein.

Block 910 may involve compressing each of the m arrays for each of the respective vectors.

Block 912 may involve mapping each of the m arrays for each of the respective vectors to blocks of nucleotides, wherein each block contains a unique block identifier representing a location in the m arrays of the respective vectors.

Block 914 may involve synthesizing the blocks of nucleotides.

Block 916 may involve storing, in a DNA-based storage medium, the blocks of nucleotides.

In some embodiments, n is 8. In some embodiments, m is 3, 4, 5, 6, or 7.

In some embodiments, the space-filling curve is a Hilbert curve. In some embodiments, the space-filling curve is a Peano curve.

In some embodiments, the differential encoding includes leaving a pre-determined percent of the indices with their original values, and identifying these indices with an integer marker that is not in the range of 0 to m−1. In some embodiments, the pre-determined percent is between 1 percent and 5 percent. In some embodiments, the pre-determined percent is 3 percent.

In some embodiments, the differential encoding includes placing an integer marker that is not in the range of 0 to m−1 at ends of each array.

In some embodiments, each of the m arrays for each of the respective vectors comprises applying Huffman encoding to each of the m arrays for each of the respective vectors.

In some embodiments, the blocks of nucleotides each contain an address primer and a suffix primer.

In some embodiments, the blocks of nucleotides contain 40 percent to 60 percent guanine and cytosine content.

In some embodiments, an initial k nucleotides of each unique block identifier encodes a color of a color channel from which the block was derived. In some embodiments, k is 3.

Some embodiments may involve: (i) performing consensus reads to obtain the blocks of nucleotides from the DNA-based storage medium; (ii) mapping the blocks of nucleotides into representations of the m arrays for each of the respective vectors; (iii) reversing the compression and differential encoding of the representations of the m arrays for each of the respective vectors; (iv) based on the space-filling curve, obtaining representations of the color channels from the representations of the m arrays for each of the respective vectors; (v) detecting, in the representations of the color channels, discolorations caused by errors, wherein each of the discolorations exists primarily in one of the color channels; (vi) inpainting the discolorations; and (vii) constructing a representation of the image from the color channels as inpainted. These embodiments may be implemented in a standalone fashion in some situations.

In some embodiments, the inpainting uses machine learning to combine edges in areas of the discolorations with color and texture information from other parts of the representation of the image.

Some embodiments may further involve smoothing, by way of bilateral filtering, the representation of the image.

VI. FURTHER IMPROVEMENTS INVOLVING CODING REDUNDANCY

The embodiments above are able to perform image storage and retrieval without adding any redundancy for error-correction of specific facial features. It can be observed that although most errors in images read out from oPools can be corrected by the automatic discoloration detection, image inpainting and post-smoothing scheme, some fine facial details like eyes and mouths may not be recovered properly. This leads to suboptimal reconstruction results, where the algorithm was unable to properly smooth out errors in the facial details like lips and cheeks without blurring the images.

Figure 10:
FIG. 10 includes images read from a DNA-based storage medium, in accordance with example embodiments.
Figure 11:
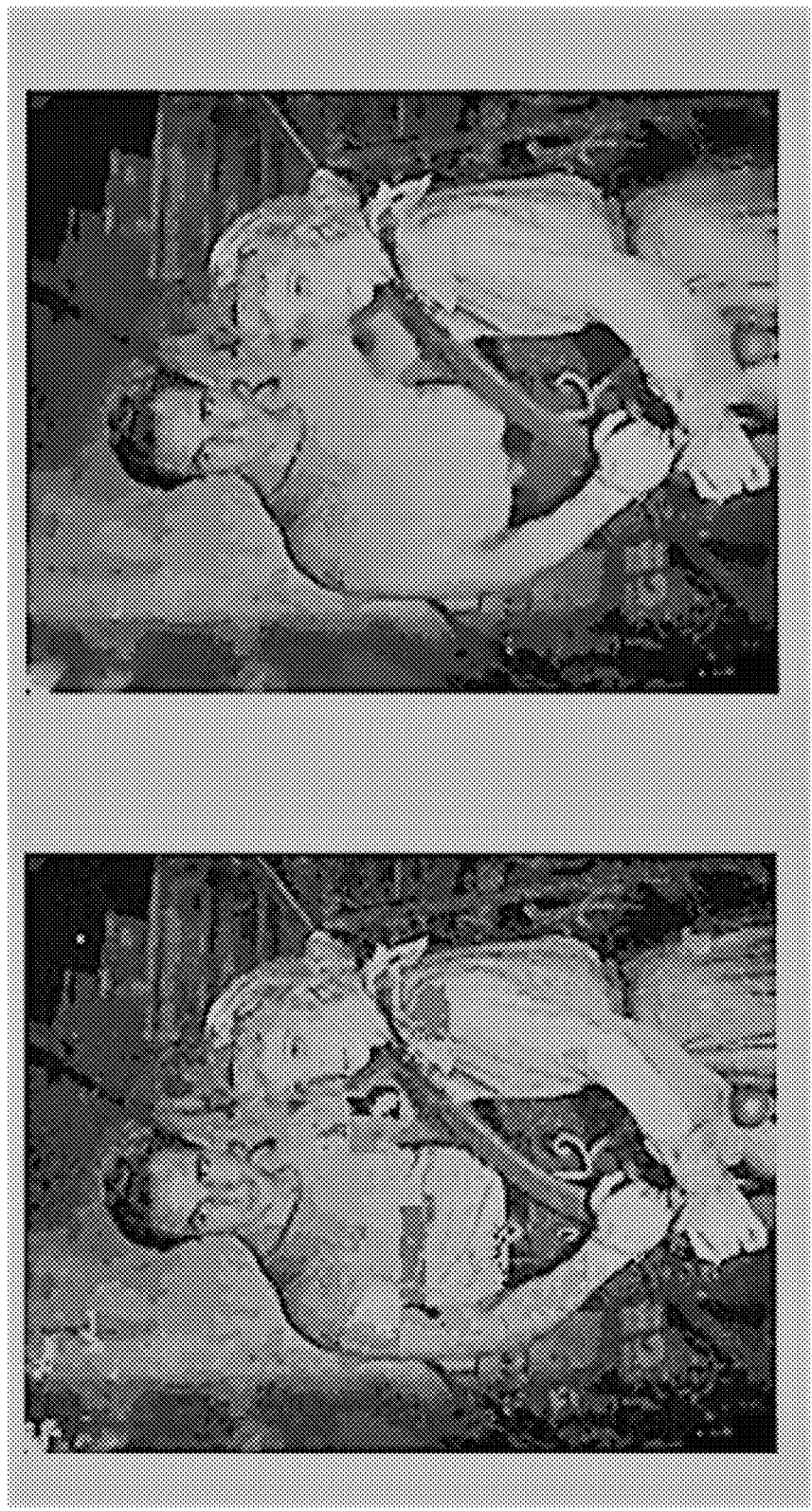
FIG. 11 also includes images read from a DNA-based storage medium, in accordance with example embodiments.

This blurring is shown in FIG. 10, where image 1000 was read out from the DNA encoding without error reconstruction, and thus has artifacts obscuring facial details. Image 1002 is a refined version of image 1000, but with blurring used to improve these details. Blurring is also shown in FIG. 11, where image 1100 was read out from the DNA encoding without error reconstruction, and thus has artifacts obscuring facial details. Image 1102 is a refined version of image 1100, but with blurring used to improve these details.

Therefore, to further improve the reconstruction performance, a small amount of coding redundancy can be added to protect oligos that record selected facial features like eyes, noses, and lips. Considering the error rate in practice and cost efficiency, a regular, systematic low-density parity-check (LDPC) can be used with a codeword length n=1200, a number of parity-check equations involving each code bit j=3, a number of code bits involved in each parity-check equation k=12 to add the redundancy.

LDPC code is a linear error correcting code, a method of transmitting a message over a noisy transmission channel, such as binary symmetric channel (BSC) and additive white Gaussian noise channel (AWGN). An LDPC is constructed using a sparse Tanner graph (subclass of the bipartite graph). LDPC codes are capacity-approaching codes, which means that practical constructions exist that allow the noise threshold to be set very close to the theoretical maximum (the Shannon limit) for a symmetric memoryless channel. The noise threshold defines an upper bound for the channel noise, up to which the probability of lost information can be made as small as desired. The maximum crossover probability LDPC code can correct decreases when code rate increases. Using iterative belief propagation techniques, LDPC codes can be decoded in time linear to their block length.

Figure 12:
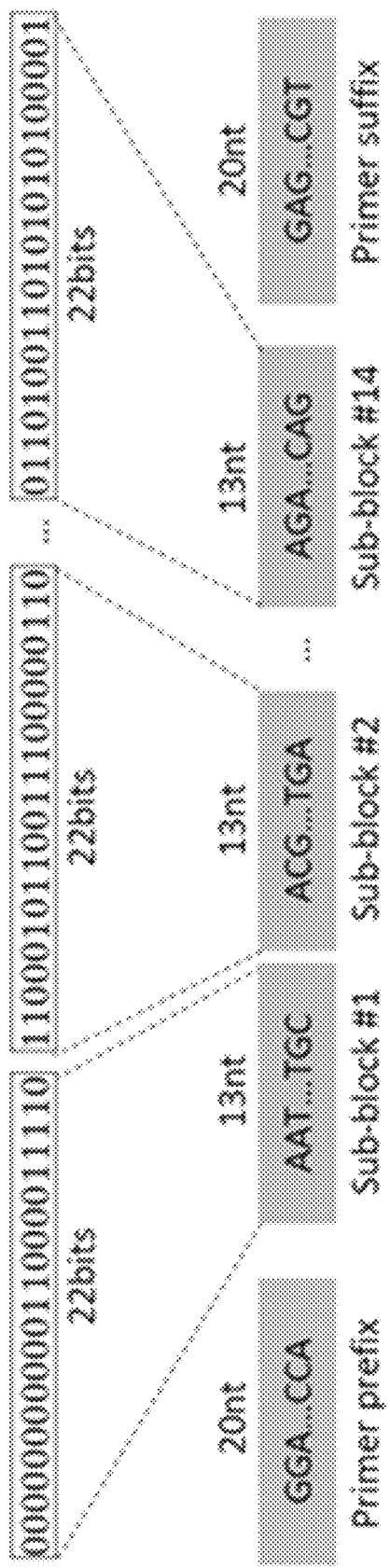
FIG. 12 depicts a redundancy encoding, in accordance with example embodiments.

In practice, the redundant information is coded with a parity check matrix and decoded with a generator matrix. When systematic codes are used, information bits and parity check bits can be stored separately. A parity check matrix is typically a sparse matrix, where the number of ones in a column j and number of ones in a row k defines the code rate $R=1-j/k$. In experiments, the (n=1200, j=3, k=12) LDPC code with code rate 3/4 was used. In the encoding procedure, the information bits related with images are then converted to DNA oligos the same as previous approach, while the generated parity check bits are first concatenated to form a long binary string, then split into sub-blocks to be converted to DNA oligos following the data organization shown in FIG. 12. Compared to the previous organization, there is no explicit address block, but the order of how to concatenate the binary strings read from DNA oligos is stored in the first 10 bits. These new oligos are of length 222 nucleotides.

Note that information about which oligos encode facial details should be included. In experiments, the indexes of those oligos are encoded according to their address blocks. Bits are then converted to DNA oligos following the arrangement of FIG. 12. These oligos can be repeated two times to form a 3-repition code, making the whole system more robust. The new design only requires 265+42*3=391 more oligos, which is of 391/11826=3.3% redundancy compared to previous pool without using any error-correction redundancy.

Figure 13:
FIG. 13 includes an image that was encoded with redundancy and read from a DNA-based storage medium, in accordance with example embodiments.
Figure 14:
FIG. 14 includes another image that was encoded with redundancy and read from a DNA-based storage medium, in accordance with example embodiments.

Significant improvements in image quality can be easily observed. In FIG. 13, image 1300 is an improved version of images 1000 and 1002 using LDPC-based redundant encoding. Similarly, in FIG. 14, image 1400 is an improved version of images 1100 and 1102 also using LDPC-based redundant encoding.

Thus, the embodiment of FIG. 9 may also include identifying facial features in the image; calculating LDPC bits for the facial features; concatenating the LDPC bits into parity blocks; mapping the parity blocks to parity nucleotides; synthesizing the parity nucleotides; and storing, in the DNA-based storage medium, the parity nucleotides. Notably, parts of the image that do not represent facial features may be encoded without redundancy.

The facial features (e.g., eyes, nose, lips, etc.) can be manually tagged with metadata in order to indicate that they should be subject to LDPC-based coding. Alternatively or additionally, various algorithms can be used to identify the facial features in an automated or semi-automated fashion. These embodiments represent the first time that unequal error protection (where some data gets more redundancy added than other data) has been used for encoding of facial features in images stored in DNA. Conventional approaches would add parity blocks for each part of the image, regardless of the content thereof, but these approaches use more memory and computational power than the embodiments herein. Unequal error-protection in conjunction with image inpainting for image backgrounds enables significant reductions in costly error-correcting coding redundancy.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   obtaining an image composed of color channels including a red color channel, a green color channel, and a blue color channel, wherein each of the color channels represents colors therein with n bits per pixel;
   quantizing each of the color channels to be represented by m bits per pixel, wherein m is less than n;
   using a space-filling curve to convert each of the color channels as quantized into respective vectors including a red channel vector, a green channel vector, and a blue channel vector, wherein entries in each of the respective vectors are represented by m bits;
   generating, for each of the respective vectors, a respective set of m arrays, wherein the m arrays for a particular vector of the respective vectors contain indices of where a fixed value selected from a range of 0 to m−1 is found in the particular vector, and wherein the indices are in increasing order;
   applying, to each of the m arrays for each of the respective vectors, differential encoding of the indices therein;
   compressing each of the m arrays for each of the respective vectors;
   mapping each of the m arrays for each of the respective vectors to blocks of nucleotides, wherein each block contains a unique block identifier representing a location in the m arrays of the respective vectors;
   synthesizing the blocks of nucleotides; and
   storing, in a DNA-based storage medium, the blocks of nucleotides.
2. The method of claim 1, wherein n is 8.
3. The method of claim 1, wherein m is 3, 4, 5, 6, or 7.
4. The method of claim 1, wherein the space-filling curve is a Hilbert curve.
5. The method of claim 1, wherein the space-filling curve is a Peano curve.
6. The method of claim 1, wherein the differential encoding includes leaving a pre-determined percent of the indices with their original values, and identifying these indices with an integer marker that is not in the range of 0 to m−1.
7. The method of claim 6, wherein the pre-determined percent is between 1 percent and 5 percent.
8. The method of claim 6, wherein the pre-determined percent is 3 percent.
9. The method of claim 1, wherein the differential encoding includes placing an integer marker that is not in the range of 0 to m−1 at ends of each array.
10. The method of claim 1, wherein each of the m arrays for each of the respective vectors comprises applying Huffman encoding to each of the m arrays for each of the respective vectors.
11. The method of claim 1, wherein the blocks of nucleotides each contain an address primer and a suffix primer.
12. The method of claim 1, wherein the blocks of nucleotides contain 40 percent to 60 percent guanine and cytosine content.
13. The method of claim 1, wherein an initial k nucleotides of each unique block identifier encodes a color of a color channel from which the block was derived, wherein the color channel is one of the color channels.
14. The method of claim 13, wherein k is 3.
15. The method of claim 1, further comprising:
   performing consensus reads to obtain the blocks of nucleotides from the DNA-based storage medium;
   mapping the blocks of nucleotides into representations of the m arrays for each of the respective vectors;
   reversing the compressing and the differential encoding of the representations of the m arrays for each of the respective vectors;
   based on the space-filling curve, obtaining representations of the color channels from the representations of the m arrays for each of the respective vectors;
   detecting, in the representations of the color channels, discolorations caused by errors, wherein each of the discolorations exists primarily in one of the color channels;
   inpainting the discolorations; and
   constructing a representation of the image from the color channels as inpainted.
16. The method of claim 15, wherein the inpainting uses machine learning to combine edges in areas of the discolorations with color and texture information from other parts of the representation of the image.
17. The method of claim 1, further comprising:
   identifying facial features in the image;
   calculating low-density parity-check (LDPC) bits for the facial features;
   concatenating the LDPC bits into parity blocks;
   mapping the parity blocks to parity nucleotides;
   synthesizing the parity nucleotides; and
   storing, in the DNA-based storage medium, the parity nucleotides.
18. An article of manufacture including a non-transitory computer-readable medium, having stored thereon program instructions that, upon execution by a computing system, cause the computing system to perform operations comprising:
   obtaining an image composed of color channels including a red color channel, a green color channel, and a blue color channel, wherein each of the color channels represents colors therein with n bits per pixel;

quantizing each of the color channels to be represented by m bits per pixel, wherein m is less than n;

using a space-filling curve to convert each of the color channels as quantized into respective vectors including a red channel vector, a green channel vector, and a blue channel vector, wherein entries in each of the respective vectors are represented by m bits;

generating, for each of the respective vectors, a respective set of m arrays, wherein the m arrays for a particular vector of the respective vectors contain indices of where a fixed value selected from a range of 0 to m−1 is found in the particular vector, and wherein the indices are in increasing order;

applying, to each of the m arrays for each of the respective vectors, differential encoding of the indices therein;

compressing each of the m arrays for each of the respective vectors; and mapping each of the m arrays for each of the respective vectors to blocks of nucleotides, wherein each block contains a unique block identifier representing a location in the m arrays of the respective vectors.

19. The article of manufacture of claim 18, wherein the blocks of nucleotides are stored in a DNA-based storage medium, wherein the operations further comprise:

performing consensus reads to obtain the blocks of nucleotides from the DNA-based storage medium;

mapping the blocks of nucleotides into representations of the m arrays for each of the respective vectors;

reversing the compressing and the differential encoding of the representations of the m arrays for each of the respective vectors;

based on the space-filling curve, obtaining representations of the color channels from the representations of the m arrays for each of the respective vectors;

detecting, in the representations of the color channels, discolorations caused by errors, wherein each of the discolorations exists primarily in one of the color channels;

inpainting the discolorations; and constructing a representation of the image from the color channels as inpainted.

20. A computing system comprising:

one or more processors;

memory; and program instructions stored in the memory, upon execution of which by the one or more processors, cause the computing system to perform operations comprising:

obtaining an image composed of color channels including a red color channel, a green color channel, and a blue color channel, wherein each of the color channels represents colors therein with n bits per pixel;

quantizing each of the color channels to be represented by m bits per pixel, wherein m is less than n;

using a space-filling curve to convert each of the color channels as quantized into respective vectors including a red channel vector, a green channel vector, and a blue channel vector, wherein entries in each of the respective vectors are represented by m bits;

generating, for each of the respective vectors, a respective set of m arrays, wherein the m arrays for a particular vector of the respective vectors contain indices of where a fixed value selected from a range of 0 to m−1 is found in the particular vector, and wherein the indices are in increasing order;

applying, to each of the m arrays for each of the respective vectors, differential encoding of the indices therein;

compressing each of the m arrays for each of the respective vectors; and mapping each of the m arrays for each of the respective vectors to blocks of nucleotides, wherein each block contains a unique block identifier representing a location in the m arrays of the respective vectors.

* * * * *